US007053579B2

(12) United States Patent
Moridaira

(10) Patent No.: US 7,053,579 B2
(45) Date of Patent: May 30, 2006

(54) DEVICE AND METHOD OF CONTROLLING OPERATION OF ROBOT APPARATUS

(75) Inventor: Tomohisa Moridaira, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/200,395

(22) Filed: Aug. 9, 2005

(65) Prior Publication Data

US 2006/0033462 A1    Feb. 16, 2006

(30) Foreign Application Priority Data

Aug. 11, 2004   (JP)  .............................. 2004-234252

(51) Int. Cl.
*B25J 13/04* (2006.01)
(52) U.S. Cl. .................. 318/568.12; 318/561; 180/8.6; 700/250
(58) Field of Classification Search ................ 318/561, 318/563, 565, 567, 568.1, 568.12, 568.16; 180/8.1, 8.2, 8.5, 8.6; 700/245, 250; 901/1
See application file for complete search history.

(56) References Cited

U.S. PATENT DOCUMENTS

| 5,095,365 | A  | * | 3/1992  | Takatoo et al. ............. 348/143 |
| 5,834,916 | A  | * | 11/1998 | Shimogama et al. .. 318/568.13 |
| 6,377,869 | B1 | * | 4/2002  | Watanabe et al. ........... 700/245 |
| 6,438,454 | B1 | * | 8/2002  | Kuroki ....................... 700/245 |
| 2004/0244505 | A1 | * | 12/2004 | Takenaka et al. ....... 73/862.541 |
| 2005/0179416 | A1 | * | 8/2005  | Iribe et al. .................. 318/563 |

* cited by examiner

*Primary Examiner*—Bentsu Ro
(74) *Attorney, Agent, or Firm*—Frommer Lawrence & Haug LLP; William S. Frommer

(57) ABSTRACT

A device of controlling an operation of a robot apparatus having at least a plurality of movable units includes a driver driving the movable units, a determiner determining states of the movable units or a state of the robot apparatus, a plurality of abnormal state detectors detecting abnormal states and performing overcoming operations on the abnormal states on the basis of the determination results determined by the determiner, and an abnormal state controller causing the abnormal state detections and the overcoming operations to be concurrently performed by the plurality of abnormal state detectors.

29 Claims, 12 Drawing Sheets

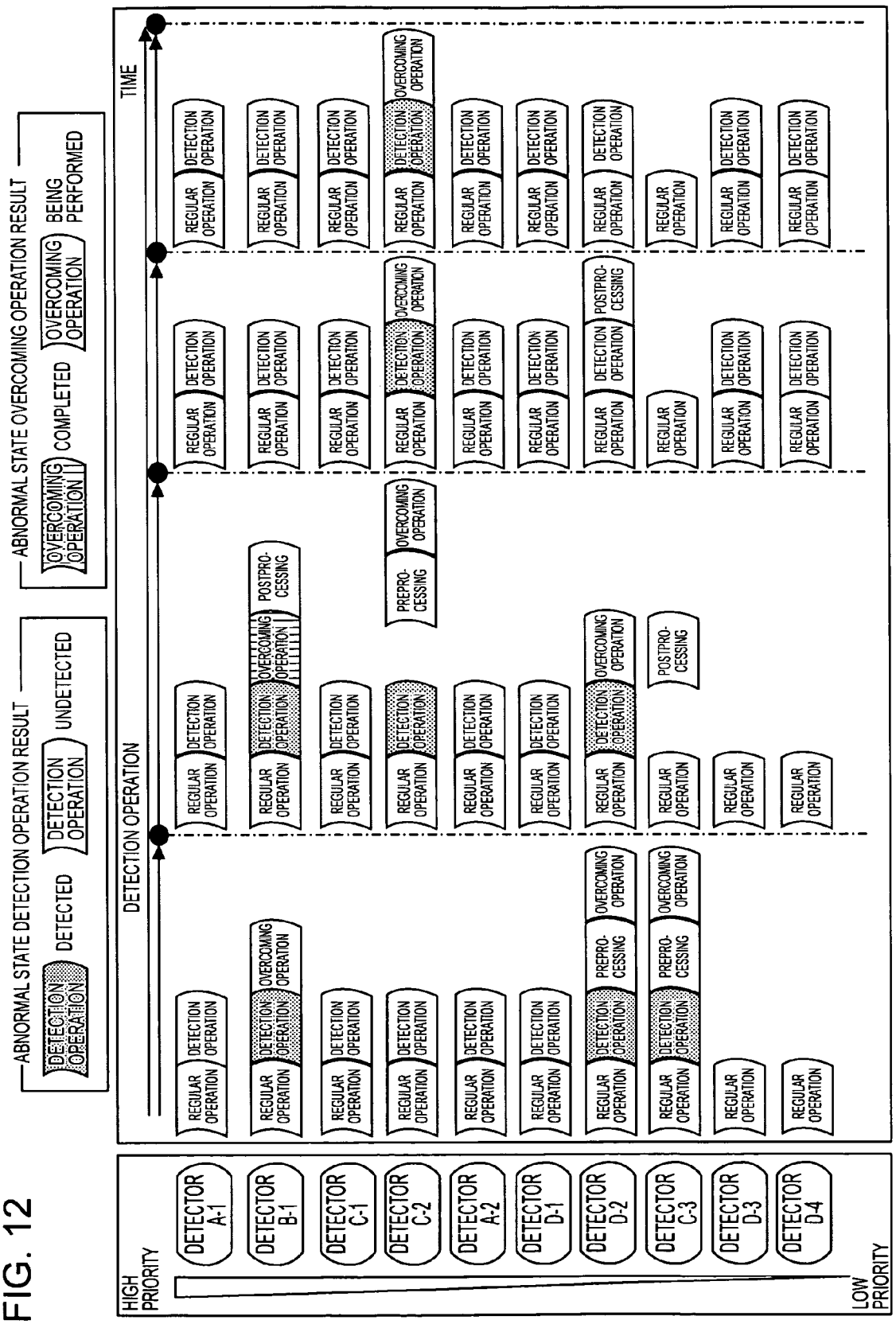

DEVICE AND METHOD OF CONTROLLING OPERATION OF ROBOT APPARATUS

CROSS REFERENCES TO RELATED APPLICATIONS

The present invention contains subject matter related to Japanese Patent Application JP 2004-234252 filed in the Japanese Patent Office on Aug. 11, 2004, the entire contents of which are incorporated herein by reference.

BACKGROUND OF THE INVENTION

1. Field of the Invention

The present invention relates to a device and method of controlling the operation of a robot apparatus having at least a plurality of movable portions, and, more particularly, to a device and method of controlling the operation of a robot apparatus to be used in various expected environments.

Even more particularly, the present invention relates to a device and method of controlling the operation of a robot apparatus which autonomously and internally overcomes an abnormal state when the abnormal state is detected in the robot apparatus. Still even more particularly, the present invention relates to a device and method of controlling the operation of a robot apparatus which autonomously overcomes combined and detected abnormal states with consistency.

2. Description of the Related Art

A robot is a mechanical device which moves like a human being by making use of electric and magnetic actions. The term "robot" is said to be derived from the Slavic word "ROBOTA" (slavish machine). In our country, the widespread use of robots began at the end of the 1960s, many of which were industrial robots, such as manipulators and conveyance robots, used, for example, for the purpose of achieving automatic production operations in factories without humans in attendance.

In recent years, advances have been made in the research and development of legged mobile robots which are designed using as a model the motion and mechanism of the body of an animal, such as a human being or an ape, which moves erect using two feet (refer to, for example, Japanese Unexamined Patent Application Publication No. 13-129775). Bipedal movement in an erect posture is unstable compared to, for example, crawling or movement using four or six legs. Therefore, in this case, the posture and walking are difficult to control. However, bipedal movement in an erect posture is excellent in that it is a flexible movement. Therefore, robots capable of such a movement can, for example, move along a rough walking surface of a working path, such as a surface having obstacles, or move along a discontinuous surface, such as moving up and down steps or a ladder.

Legged mobile robots which reproduce the movements and bodily mechanisms of a human being are called humanoid robots. Humanoid robots help people in life, that is, help them in various human activities in situations in living environments and in various other situations in everyday life.

Most of the working spaces and living spaces of human beings are formed in accordance with the behavioral mode and the body mechanism of a human being which walks erect using two legs. For moving present mechanical systems using wheels or other such driving devices as mover, many obstacles exist. Therefore, it is preferable that the movable range of the robot be about the same as that of human beings in order for the mechanical system, that is, the robot to carry out various human tasks in place of them, and to deeply penetrate the living space of human beings. This is the reason why there are great expectations for putting a legged mobile robot into practical use.

Posture stability control of legged mobile robots is often achieved by making use of ZMP (zero moment point) as a norm for determining the degree of walking stability. ZMP referred to here is a point on a floor surface where the moment caused by reaction force of the floor while the robot is walking is zero. The norm for determining the degree of walking stability by ZMP is based on D'Alembert's principle in which gravitation and inertial force from a walking system to a floor surface and their moments balance floor reaction force and floor reaction moment from the floor surface to the walking system. The inference in terms of dynamics is that there is a point, that is, a ZMP where a pitch axis moment and a roll axis moment are zero within a side of a supporting polygon defined by the floor surface and the points of contact of the sole with the floor (refer to, for example, "Legged Locomotion Robots" by Miomir Vukobratovic, and "Walking Robot and Artificial Leg" by Ichiro Kato et al. (Nikkann Kogyou Shinbun-sha)).

A target ZMP control is successfully achieved in an actual robot by planning its motion so that it moves in a dynamically balanced manner every instant. According to a bipedal walking pattern based on ZMP, the points where the soles contact the floor can be previously set, so that, for example, it is easy to consider kinematic constraints on the ends of the feet in accordance with the shape of the floor surface. When ZMP is used as a norm for determining the degree of stability, a trajectory instead of force is used as a target value for controlling movement. Therefore, technically speaking, the probability putting ZMP into practical use is increased.

Here, a tall legged mobile robot is assumed as being used in various environments regardless of whether the ground is level or rough, so that it may be used in many circumstances where a control system of the body of the robot deviates from guaranteed operation conditions. Therefore, it is more probable that an abnormal state occurs in an unexpected circumstance in such a robot than in other mechanical devices. Consequently, it is desirable that the robot internally detects an abnormal state and autonomously overcomes the detected abnormal state. Two or more abnormal states may occur in combination. It is necessary for the robot to overcome the individual abnormal states with consistency.

Many related robot technologies attach importance to functions. Therefore, most related robot technologies do not provide safety functions with respect to the external world. For example, although industrial robots provide many safety measures, they do not internally have safety functions, that is, safety functions are primarily provided outside the robot, such as providing a spatial threshold so that a person does not enter its movable section or providing an emergency stop switch (refer to, for example, Japanese Unexamined Patent application Publication No. 2001-38661).

If it is assumed that a robot, such as an entertainment robot, will be used in households, it will become increasingly necessary for the robot to act so as not to be adversely affected by the external world such as the environment or the user and so as to reduce injuries of and the load on the robot itself. In other words, the robot needs to internally detect any abnormal state and quickly and autonomously overcome the abnormal state.

Here, if a human being touching something hot is taken as an example, the robot needs to have a function that overcomes the abnormal state at an early stage by instinctively withdrawing the hand rather that withdrawing the hand after rationally feeling that that something is hot.

SUMMARY OF THE INVENTION

It is desirable to provide an excellent device and method of controlling the operation of a robot apparatus which can perform an autonomous or self-contained operation in various environments.

It is also desirable to provide an excellent device and method of controlling the operation of a robot apparatus which can internally and autonomously overcome an abnormal state when the abnormal state is internally detected.

It is further desirable to provide an excellent device and method of controlling the operation of a robot apparatus which can autonomously overcome combined and detected abnormal states with consistency.

A device of controlling an operation of a robot apparatus having at least a plurality of movable units according an embodiment of the present invention includes driving means for driving the movable units, determining means for determining states of the movable units or a state of the robot apparatus, a plurality of abnormal state detecting means for detecting abnormal states and performing overcoming operations on the abnormal states on the basis of the determination results determined by the determining means, and abnormal state controlling means for causing the abnormal state detections and the overcoming operations to be concurrently performed by the plurality of abnormal state detecting means.

In order for the robot apparatus to become widely used, perform various human tasks in place of human beings, and to become autonomous, there is a demand for the robot apparatus to internally detect an abnormal state and autonomously overcome the detected abnormal state. However, it is more probable for an abnormal state to occur in a legged mobile robot and the like which takes an unstable erect posture and operates in environments regardless of whether the ground is level or rough than in other mechanical devices in unexpected circumstances due to the existence of various circumstances where a control system of the body of the robot deviates from guaranteed operation conditions. In such case, two or more abnormal states may occur in combination, in which case these abnormal states must be overcome with consistency.

The abnormal state controlling means may assign priorities to the plurality of abnormal state detecting means and concurrently operate the abnormal state detecting means on the basis of the priorities with consistency.

The abnormal state controlling means may dynamically perform a setting of an operation of each of the abnormal state detecting means in either an effective or ineffective state, and assigning of priorities.

When the robot apparatus is capable of taking a plurality of postures, the abnormal state controlling means may register any abnormal state detecting means to be set in an effective state according to the postures. For example, if the robot apparatus is a legged mobile robot having at least a plurality of movable legs, it takes a standing posture, a sitting posture, and a lying posture, so that the abnormal state controlling means registers the abnormal state detecting means in the respective postures. For example, the abnormal state controlling means may register the abnormal state detecting means related to emergency stop, torque limiter detection, overcurrent protection, getting caught prevention, fall control, and fall prevention control in the standing posture and may register in addition to the abnormal state detecting means related to emergency stop, torque limiter detection, overcurrent protection, and getting caught prevention, the abnormal state detecting means related to roll detection instead in each of the sitting posture and lying posture since it will not fall in these postures.

When the robot apparatus is capable of being in a plurality of operation modes, the abnormal state controlling means may register any abnormal state detecting means to be set in an effective state according to the operation modes.

For example, in a Pro mode for maximally making use of the performance of the robot apparatus, the abnormal state controlling means may only register the minimum number of abnormal state detecting means, including those related to emergency stop, torque limiter detection, and overcurrent detection, for preventing injury to the robot apparatus. In an apparatus body protection mode for preventing injury to the apparatus body, the abnormal state controlling means may register the abnormal state detecting means related to fall detection and fall prevention in addition to the minimum number of abnormal state detecting means, including those related to emergency stop, torque limiter detection, and overcurrent detection, for preventing injury to the robot apparatus resulting from an operation of the apparatus body. In the operation mode for maintaining the safety of the apparatus body and a user, the abnormal state controlling means may register the abnormal state detecting means, including that related to getting caught prevention, for providing the user safety in addition to the minimum number of abnormal state detecting means, including those related to emergency stop, torque limiter detection, and overcurrent detection, for preventing injury to the robot apparatus resulting from an operation of the apparatus body and the abnormal state detecting means, including those related to fall detection and fall prevention, for protecting the apparatus body.

The abnormal state controlling means may successively start the registered abnormal state detecting means according to priority in every predetermined control period or with a set frequency, so that these are operated concurrently.

Each abnormal state detecting means may perform a plurality of operations including a regular operation for processing the determination result from the determining means, an abnormality detection operation for determining whether or not the determination result has reached a level at which the abnormality should be detected, preprocessing for starting the overcoming operation of the abnormality, the overcoming operation on the abnormality, and postprocessing of the overcoming operation. In such a case, the abnormal state controlling means may alternately start the abnormal state detecting means according to priority with each regular operation and abnormality detection operation according to priority to perform these operations concurrently.

The abnormal state controlling means may execute only the overcoming operation on the abnormal state of top priority among the detected abnormal states.

The abnormal state controlling means may divide the plurality of abnormal state detecting means into two or more groups.

The abnormal state controlling means may execute only the overcoming operation on the abnormal state of top priority among the detected abnormal states in each group.

The abnormal state controlling means may assign priorities to the groups, and successively start the registered abnormal state detecting means in each group according to the priorities.

Accordingly, according to different forms of the invention, there is provided an excellent device and method of controlling the operation of a robot apparatus which can internally and autonomously overcome an abnormal state when the abnormal state is internally detected.

According to the different forms of the invention, there is provided an excellent device and method of controlling the operation of a robot apparatus which can autonomously overcome combined and detected abnormal states with consistency.

According to the different forms of the invention, the design of a robot apparatus in which expected abnormal states are overcome makes it possible to easily perform mounting without considering other abnormal states. In addition, properly assigning priorities to the abnormal state detectors makes it possible to achieve a robot apparatus providing a high level of safety.

The robot apparatus according to the different forms of the present invention has a plurality of abnormal state detectors operating independently for detecting various abnormal states. By mechanically manipulating the effective/ineffectiveness of the abnormal state detectors and their priorities, it is possible to vary abnormal state overcoming capabilities in an emergency of the robot apparatus according to different uses.

Other objects, features, and advantages will become apparent from a detailed description of an embodiment of the present invention below with reference to the attached drawings.

BRIEF DESCRIPTION OF THE DRAWINGS

FIG. 12 shows an example of an operation procedure when the groups are mixed and registered and abnormal state overcoming operations are concurrently performed according to priorities of the abnormal state detectors.

DESCRIPTION OF THE PREFERRED EMBODIMENT

An embodiment of the invention will hereunder be described in detail with reference to the drawings.

In the invention, a robot apparatus is assumed as having a plurality of joints connected to the body and having provided to respective joint actuators (that is, devices corresponding to joint driving operations) target command values (such as an angle, torque, actuator gain) which are based on the generation of a real time operation and a static motion in each control period in the robot.

Figure 1:
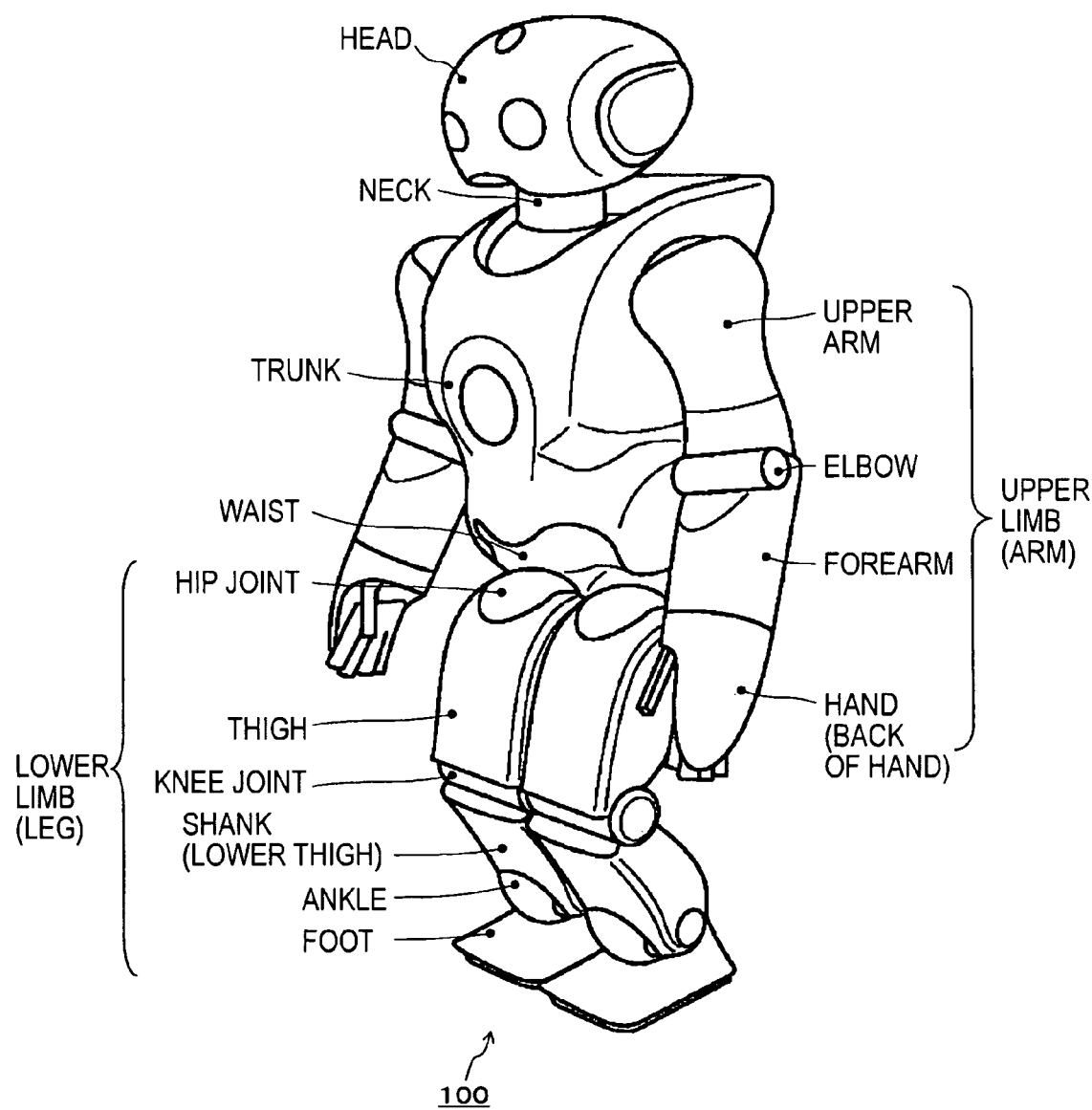
FIG. 1 is a front view of a humanoid robot apparatus 100 according to an embodiment of the present invention in an erect state.
Figure 2:
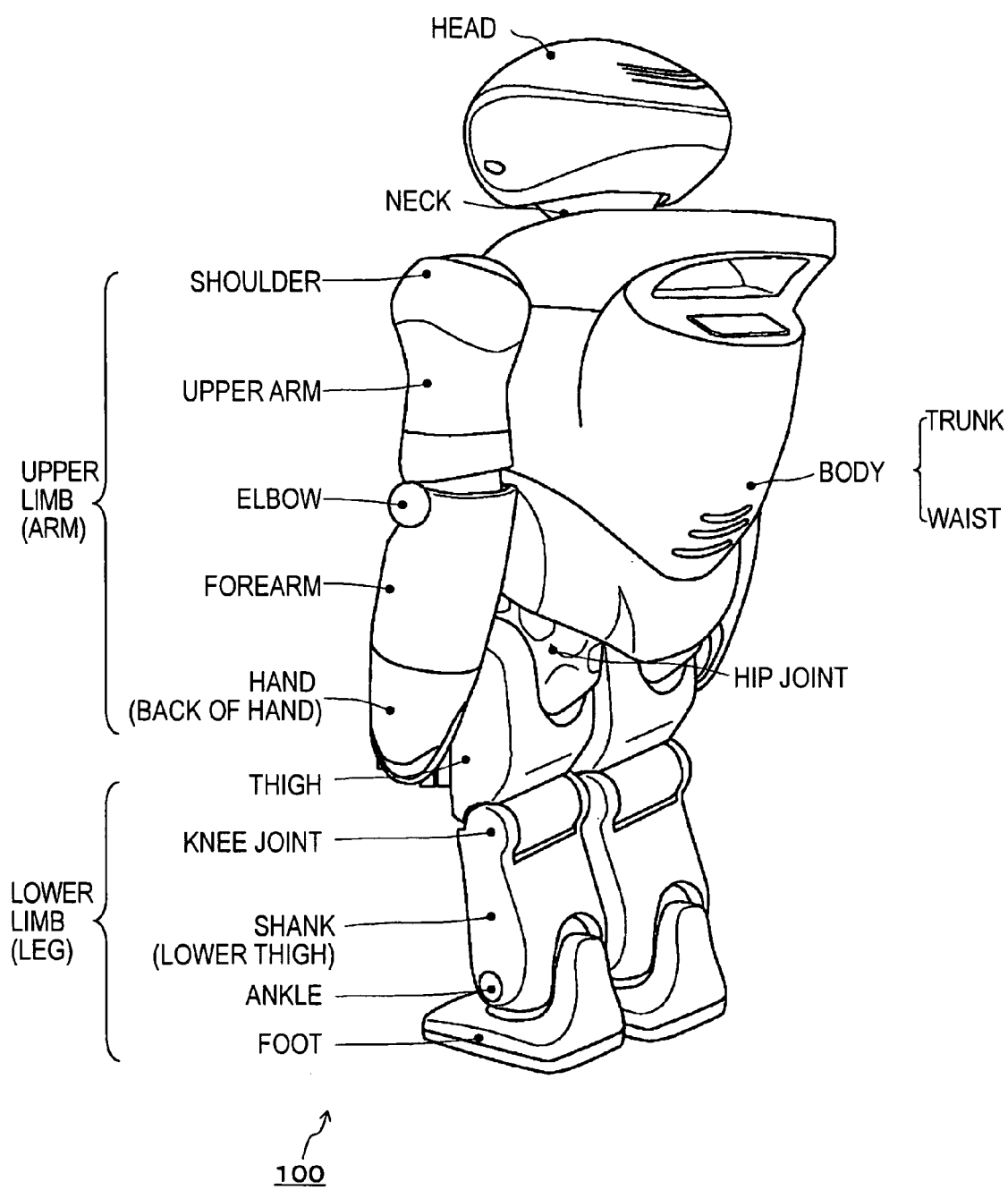
FIG. 2 is a back view of the humanoid robot apparatus 100 according to the embodiment of the present invention in the erect state.

FIGS. 1 and 2 are front and back views showing a humanoid robot apparatus 100 in an erect posture according to an embodiment of the present invention. As shown in the figures, the robot apparatus 100 has a body, a head, left and right upper limbs, two lower limbs or left and right legs used for movement. The operation of the robot apparatus is generally controlled with, for example, a control unit (not shown) incorporated in the body.

The left and right lower limbs each have a thigh, a knee joint, a shank, an ankle, and a foot. They are connected to substantially the bottom end of the trunk by corresponding hip joints. The left and right upper limbs have corresponding upper arms, elbow joints, and forearms. They are connected to their corresponding left and right upper side edges of the trunk by corresponding shoulder joints. The head is connected to substantially the uppermost end center portion of the trunk by a neck joint.

The robot apparatus 100 having such a structure can perform bipedal walking by controlling the operation of the whole body so as to be harmonious by a control section (not shown in FIGS. 1 and 2). In general, such bipedal walking is performed by repeating a walking cycle that is divided into the following operation periods:

(1) a single foot supporting period in which the right foot is lifted and the left foot supports the body, (2) both feet supporting period in which the right foot has come into contact with the floor, (3) a single foot supporting period in which the left foot is lifted and the right foot supports the body, and (4) both feet supporting period in which the left foot has come into contact with the floor.

The control section includes a controller (main control section) and a housing incorporating a power circuit and other peripheral devices. The controller controls driving of each joint actuator making up the robot apparatus 100 and processes external inputs from, for example, sensors (described later). The control section may also include a communication device or a communication interface for remote control operation.

The walking of the robot apparatus 100 is controlled by previously planning target paths of the lower limbs and correcting the planned paths in each of the aforementioned periods. In other words, in each of the both feet supporting periods, the corrections of the paths of the lower limbs are stopped and the height of the waist is corrected with a constant value using a total correction amount with respect to the planned paths. In each of the single foot supporting periods, a corrected path is generated so that the relationship between the relative positions of the waist and the ankle that have been corrected is restored to the planned path relationship.

The controlling of the stability of the posture of the robot apparatus, as typified by correcting the walking paths, makes use of ZMP as a norm for determining the degree of walking stability. Interpolation calculation using a polynomial of degree 5 is performed so that the position, speed, and acceleration are continuous for reducing deviation with respect to ZMP. The norm for determining the degree of walking stability by ZMP is based on D'Alembert's principle in which gravitation and inertial force from a walking system to a floor surface and their moments balance with floor reaction force and floor reaction moment from the floor surface to the walking system. The inference in terms of dynamics with regard to this principle is that there is a point, that is, a ZMP where a pitch axis moment and a roll axis moment are zero within a supporting polygon (that is, a ZMP stable area) defined by a floor surface and the points of contact of the sole with the floor.

Figure 3:
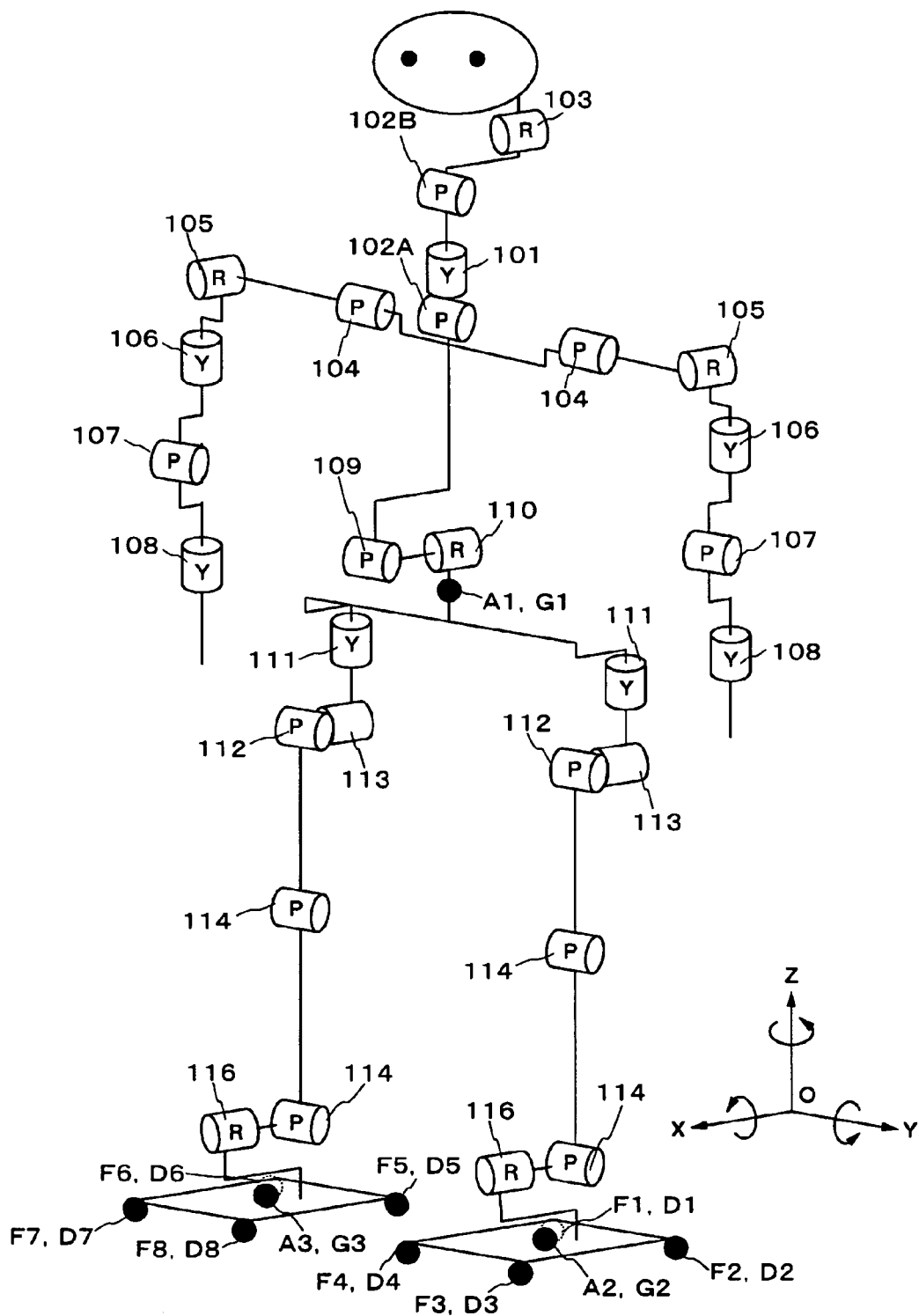
FIG. 3 is a schematic view of the structure of the degrees of freedom provided by joints of the robot apparatus 100.

FIG. 3 is a schematic view of the structure of the degrees of freedom provided by joints of the robot apparatus 100. As shown in FIG. 3, the robot apparatus 100 has a head 1, upper limbs including two arms, lower limbs including two legs used for movement, and a trunk which connects the upper limbs and the lower limbs.

A neck joint which supports the head 1 possesses four degrees of freedom which are provided in correspondence with a neck joint yaw axis 101, a neck joint pitch axis 102A, a head pitch axis 102B, and a neck joint roll axis 103.

Each arm has degrees of freedom which are provided in correspondence with a shoulder joint pitch axis 104, a shoulder joint roll axis 105, an upper arm yaw axis 106, an elbow joint pitch axis 107, a wrist joint yaw axis 108, and a hand. Each hand is actually a structure which has many joints and degrees of freedom and a plurality of fingers.

The trunk possesses two degrees of freedom which are provided in correspondence with a trunk pitch axis 109 and a trunk roll axis 110.

The legs of the lower limbs each include a hip joint yaw axis 111, a hip joint pitch axis 112, a hip joint roll axis 113, a knee joint pitch axis 114, an ankle joint pitch axis 115, an ankle joint roll axis 116, and a foot 22.

The robot apparatus 100 does not need to have all of the aforementioned degrees of freedom. In addition, the degrees of freedom of the robot apparatus 100 are not limited to the aforementioned degrees of freedom. Therefore, it goes without saying that the number of degrees of freedom or joints can be increased or decreased as required in accordance with, for example, the requirement specification or constrains with respect to design/production.

Each degree of freedom of the above-described robot apparatus 100 is actually provided by using its corresponding rotary actuator. To respond to various demands of, for example, approximating the form of the robot to the natural form of a human being by removing extra bulges from the external appearance of the robot, and controlling the posture of an unstable structure which performs bipedal walking, it is preferable to use small and light joint actuators.

In the embodiment, small AC servo actuators which are directly connected to gears and which incorporate in a motor unit a control substrate having a circuit of a sensor system, a power supply system, and a servo control system are used. Examples of the sensor in the motor unit include an angle/position sensor for detecting a rotational position or joint position for servo control, an acceleration sensor or a gyro sensor for performing posture stability control (for example, obtaining a parameter of a ZMP formula), and a torque sensor or an electrical current detection sensor for detecting an abnormal state. By using a low reduction gear as a gear for direct connection to an actuator motor, a passive characteristic of a drive system itself required in the robot apparatus 100 in which importance is placed on physical interaction with a human being is obtained. This type of AC servo actuator is disclosed in, for example, Japanese Unexamined Patent Application Publication Nos. 2004-181613 and 2000-299970 already assigned to the applicant.

Figure 4:
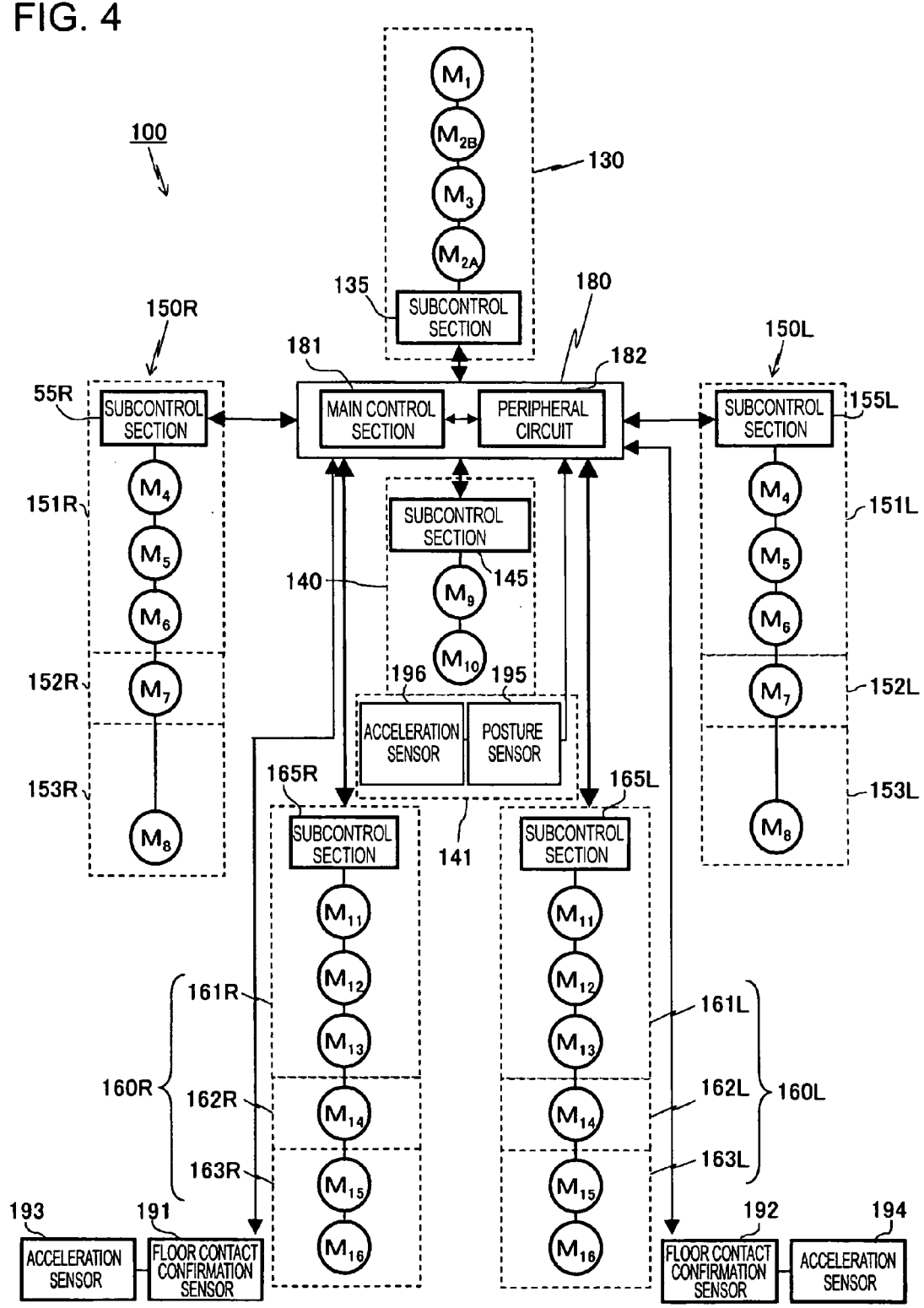
FIG. 4 is a schematic view of the structure of a control system of the robot apparatus 100.

FIG. 4 is a schematic view of the structure of a control system of the robot apparatus 100. As shown in FIG. 4, the robot apparatus 100 includes mechanical units 130, 140, 141, 150R/L, and 160R/L (used for providing the four limbs of a human being) and a control unit 180 for performing a suitable control for realizing harmonious operation between each mechanical unit. (R and L denote right and left, respectively. These letters will be used accordingly below.)

The operation of the whole robot apparatus 100 is generally controlled by the control unit 180. The control unit 180 includes a main control section 181 and a peripheral circuit 182. The main control section 181 includes main circuit components (not shown) such as a central processing unit (CPU) and a memory. The peripheral circuit 182 includes, for example, a power circuit and an interface (neither of which are shown). The interface transmits and receives data and commands to and from each structural part of the robot apparatus 100.

The peripheral circuit 182 refers to an externally attached peripheral connected through a cable or a wireless medium and an interface connector for connecting a charging station (not shown) or other peripherals as well to peripherals installed in the robot apparatus.

In terms of achieving the invention, the place where the control unit 180 is set is not particularly limited. Although the control unit 180 is mounted to the trunk unit 140 in FIG. 4, it may be mounted to the head unit 130. Alternatively, the control unit 180 may be disposed outside the robot apparatus 100 to perform communication with the body of the robot apparatus 100 by cable or a wireless medium.

The degrees of freedom provided by the respective joints in the robot apparatus 100 shown in FIG. 3 are achieved by the respective actuators. More specifically, a neck joint yaw axis actuator $M_1$, a neck joint pitch axis actuator $M_2$, and a neck joint roll axis actuator $M_3$ are disposed at the head unit 130 for providing the neck joint yaw axis 101, the neck joint pitch axis 102A, and the neck joint roll axis 103, respectively.

A trunk pitch axis actuator $M_9$ and a trunk roll axis $M_{10}$ are disposed at the trunk unit 140 for providing the trunk pitch axis 109 and the trunk roll axis 110.

The arm units 150R/L include upper arm units 151R/L, hip joint units 152R/L, and forearm units 153R/L. A shoulder joint pitch axis actuator $M_4$, a shoulder joint roll axis actuator $M_5$, an upper arm yaw axis actuator $M_6$, an elbow joint pitch axis actuator $M_7$, and a wrist joint yaw axis actuator $M_8$ are disposed at each of the arm units 150R/L for providing the shoulder joint pitch axis 104, the shoulder joint roll axis 105, the upper arm yaw axis 106, the elbow joint pitch axis 107, and the wrist joint yaw axis 108.

The leg units 160R/L include thigh units 161R/L, knee units 162R/L, and shank units 163R/L. A hip joint yaw axis actuator $M_{11}$, a hip joint pitch axis actuator $M_{12}$, a hip joint roll axis actuator $M_{13}$, a knee joint pitch axis actuator $M_{14}$, an ankle joint pitch axis actuator $M_{15}$, and an ankle joint roll axis actuator $M_{16}$ are disposed at each of the leg units 160R/L for achieving the hip joint yaw axis 111, the hip joint pitch axis 112, the hip joint roll axis 113, the knee joint pitch axis 114, the ankle joint pitch axis 115, and the ankle joint roll axis 116.

The actuators $M_1, M_2, M_3, \ldots M_{16}$ used at the respective joints are desirably small AC servo actuators (mentioned above) which are directly connected to gears and which incorporate in a motor unit a servo control system, etc., formed into a one-chip system.

A subcontrol section 135, a subcontrol section 145, subcontrol sections 155, and subcontrol sections 165 for controlling the driving of the actuators are disposed in the head unit 130, the trunk unit 140, the arm units 150, and the leg units 160, respectively.

An acceleration sensor 196 and a posture sensor 195 are disposed at the waist 141. The acceleration sensor 196 is disposed in X, Y, and Z axial directions. By disposing the acceleration sensor 196 at the waist 141, it is possible to set the waist, which is a part having a large mass operation amount, as a control object point, and directly measure the posture and acceleration at this position in order to perform a posture stability control on the basis of ZMP. The acceleration sensor 96 and the posture sensor 95 are formed as an acceleration sensor A1 and a gyro sensor G1 in FIG. 3, respectively.

Floor contact confirmation sensors 191 and 192 and acceleration sensors 193 and 194 are disposed at the right leg 160R and the left leg 160L, respectively. The floor contact confirmation sensors 191 and 192 are formed by, for example, mounting pressure sensors to the respective soles and can detect whether or not whether or not the soles have come into contact with the floor on the basis of the presence or absence of a floor reaction force. The acceleration sensors 193 and 194 are disposed at at least the X and Y axial directions. By disposing the acceleration sensors 193 and 194 at the right and left feet, respectively, it is possible to directly form a ZMP formula at the feet that are closest to the ZMP positions. In FIG. 3, sensors A2 and A3 for measuring the accelerations at the feet and gyro sensors G2 and G3 for measuring the orientations of the feet are disposed at the left and right ankles, respectively. Force sensors F1 to F4 and force sensors F5 to F8 for determining floor contact and floor reaction force are disposed at the four corners of the left and right soles, respectively.

In the embodiment, a reaction force sensor system (reaction force sensors, etc.) for directly determining ZMP and force are disposed at the feet that are parts that contact the floor surface. In addition, a local coordinate system used for controlling the operation of the robot apparatus and acceleration sensors for directly determining the coordinate system are provided. Therefore, directly forming a ZMP equilibrium equation at the feet that are closest to the ZMP positions makes it is possible to achieve a more exact posture stability control with high speed. As a result, it is possible to guarantee the stable walling (motion) of the robot apparatus even, for example, on long villi or gravel ground whose surface moves when a force or torque is applied thereto or on tiles in homes where the robot apparatus tends to slip because a sufficient translational frictional coefficient cannot be provided.

The main control section 181 can respond to the outputs of the sensors A1 to A3, G1 to G3, and F1 to F8, and dynamically correct control targets. More specifically, the main control section 181 performs a suitable controlling operation on each of the subcontrol sections 135, 145, 155R/L, and 165R/L, so that a whole-body-motion pattern for harmoniously driving the upper limbs, the trunk, and the lower limbs of the robot apparatus 100 is achieved.

For the motion of the whole body of the robot apparatus 100, feet movements, ZMP paths, trunk motion, upper limb motions, the height of the waist, and the like are set. Commands for commanding operations in accordance with the setting contents are transmitted to the subcontrol sections 135, 145, 155R/L, and 165R/L. The subcontrol sections 135, 145, 155R/L, and 165R/L interpret the commands that they have received from the main control section 181, and output drive control signals to the actuators $M_1, M_2, M_3, \ldots M_{16}$. ZMP referred to here is a point on a floor surface where the moment caused by reaction force of the floor while the robot is walking is zero. ZMP path referred to here is a path in which the ZMP moves while, for example, the robot apparatus 100 is walking.

A legged mobile robot may use ZMP as a norm for determining the degree of walking stability. The norm for determining the degree of stability in terms of the ZMP allows a system to form a proper ZMP space. If the ZMP is within a supporting polygon, a rotational motion or a translational motion does not occur in the system, so that it is not necessary to solve a motion equation regarding rotation or translational motion. In contrast, if the ZMP is not within the supporting polygon, or when a point of application of support with respect to the external world does not exist, it is necessary to solve a motion equation in place of a ZMP equation. When the feet of the robot apparatus are off the floor, such as when the robot apparatus jumps or jumps down from an elevated place, a supporting polygon does not exist, so that the motion equation is solved instead of the ZMP equation.

A ZMP equation provides the equilibrium of the moments at a target ZMP. For example, when the robot apparatus is expressed by a plurality of mass points $m_i$ and these main points $m_i$ are defined as control object points, a ZMP equilibrium equation is formed as an equation for determining a path defined by the control points where the total sum of the moments on the target ZMP generated at all of the control object points $m_i$ is zero. The ZMP equilibrium equation includes a floor reaction force moment (moment abnormality component) T at the target ZMP. By reducing the moment abnormality to zero or to within an allowable range, the stability of the posture of the robot apparatus is maintained. In other words, correcting the motion (feet motion, path of each part of upper part of the body, etc.) of the robot apparatus so that the moment abnormality is zero or is equal to or less than an allowed value is the essence of performing posture stability control on the basis of ZMP serving as a norm for determining the degree of stability.

The robot apparatus 100 according to the embodiment has its center of gravity set at the waist. The waist is an important control object point for performing posture stability control and forms a main body of the robot apparatus 100.

Such a legged mobile robot described above is very entertaining and has excellent performability such as smooth walking and execution of various tasks. However, the legged mobile robot may undergo various abnormal states. For example, it may fall or get caught in something or an excess load may be applied to an actuator due to increased torque. In addition, the robot may undergo the various abnormal states in combination or its abnormal state to be detected may change depending upon the posture of the robot.

Therefore, there is a demand for a robot apparatus which internally detects an abnormal state and which autonomously overcomes the detected abnormal state. In addition, when two or more abnormal states occur in combination, these abnormal states must be overcome with consistency.

In the embodiment, the robot apparatus has a plurality of abnormal state detectors which operate concurrently and independently for detecting various abnormal states. When an abnormal state is detected, the abnormal state is autonomously overcome without a higher order control system for performing a thinking control operation and action control operation, so that a quick response is achieved. When an abnormal state is detected, a command from the higher order control system is stopped in order to prevent a malfunction. By previously assigning priorities to the abnormal state detectors, even if two or more abnormal states occur in combination, the abnormal states are overcome with consistency in accordance with the priorities assigned to the abnormal states.

Figure 5:
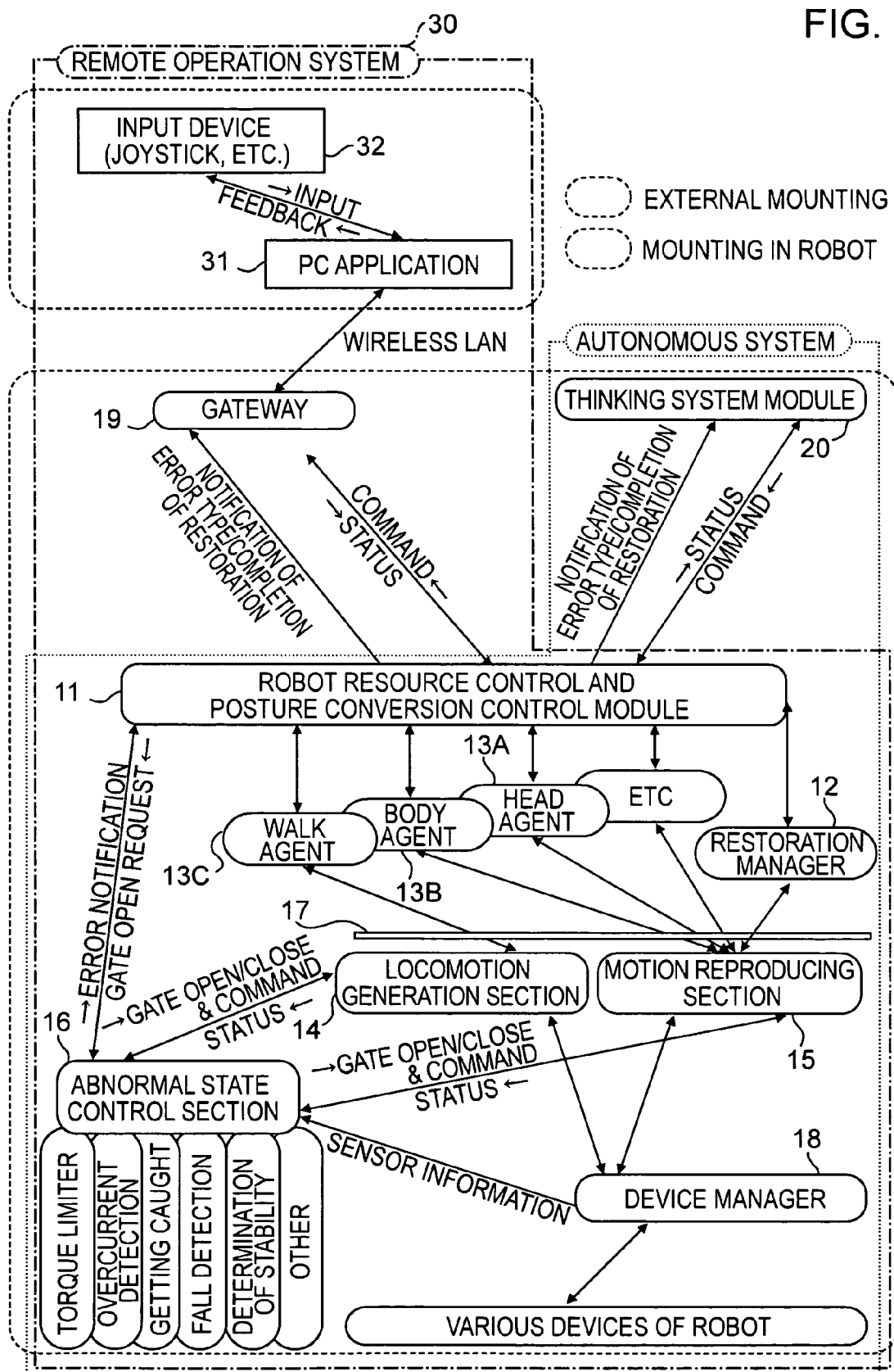
FIG. 5 is a schematic view of a functional structure of an operation control system of a legged mobile robot capable of detecting a plurality of abnormal states and overcoming the abnormal states.

FIG. 5 is a schematic view of a functional structure of an operation control system of a legged mobile robot capable of detecting a plurality of abnormal states and overcoming the abnormal states.

As shown in FIG. 5, the legged mobile robot according to the embodiment operates in accordance with a command from a thinking module 20 (internally disposed in the body of the robot and controlling autonomous operation) and a command from a remote operation system (remote operation device, etc.) 30 mounted outside the body of the robot.

The thinking module 20 realizes autonomous action and operation at the body of the robot. For example, Japanese Unexamined Patent Application Publication No. 2003-334785 already assigned to the applicant discloses a robot action control system for performing contemplated action control or situation dependent action control on the basis of an external stimulation or an internal state. For example, although the thinking module 20 includes such an action control system, the gist of the present invention is not particularly limited thereto.

The remote operation system module 30 has, for example, a calculator system provided with a wireless LAN function such as a personal computer (PC), and includes an input device 32 and a PC application 31.

The input device 32 includes a user input device such as a joystick, a keyboard, a mouse, etc., and receives a command for the robot by a manual operation of a user.

The PC application 31 is connected to the robot via the wireless LAN and exchanges data with the actual robot. The PC application 31 generally monitors an input device signal, converts the input device signal into a robot command, transmits the robot command to the robot, and receives a response or a notification of an abnormality from the robot.

A gateway 19 incorporates a communication protocol (such as a transmission control protocol/internet protocol (TCP/IP)) and is an object in the robot for achieving wire or wireless communication with an external computer such as the remote operation module 30.

A robot resource control and posture conversion control module 11 distributes operations in resource units, such as head, body, arms, and legs, in accordance with the transmitted commands. For converting the posture, it determines the consistency and converts the posture lacking consistency with the command to that having consistency.

When the robot is in an unknown posture, a restoration manager 12 restores the robot from the unknown posture to a known posture that is closest to the unknown orientation, so that the robot is restored to a predetermined posture conversion model.

An agent group plans the operation for each resource, generates the locomotion in accordance with each content, and requests, for example, the reproduction of each motion. In the illustrated example, the agent group includes, for example, a head agent 13A for planning the operation of the head, a body agent 13B for planning the operation of the body, and a walk agent 13C for planning a walking operation.

A locomotion generation section 14 is an object for generating locomotion in real time in accordance with the request from the agent group. With respect to the generation result, the locomotion generation section 14 considers the stability of the posture, calculates the joint angles of the lower limbs, and generates command values to devices.

A motion reproducing section 15 changes the command values of the respective joint angles in accordance with the motions requested from the agent group.

An abnormal state control section 16 generally refers to sensor values of the respective devices and monitors the presence or absence of abnormal states. Here, the abnormal states may refer to those related to, for example, torque limiter, overcurrent detection, "getting caught" prevention, falling, and stability determination. The abnormalities are assigned priorities, and are detected and overcome starting from those of higher priority.

In the embodiment, the abnormal state control section 16 includes a plurality of abnormal state detectors which can operate independently and concurrently. Each abnormal state detector is formed with a design that allows each detector to be independent of each other. In the design of the robot apparatus which overcomes expected abnormal states, each abnormal state detector can be easily mounted without considering the other abnormal state detectors. By properly assigning priorities to the abnormal state detectors, a robot apparatus having a high safety level is achieved. For example, if a plurality of abnormal states are combined and detected, the robot apparatus can autonomously overcome the combined abnormal states with consistency on the basis of priority. The effectiveness/ineffectiveness of each abnormal state detector and the priorities of the abnormal state detectors may be dynamically manipulated in order to vary the overcoming capability of the robot apparatus in an emergency according to use. The abnormal state control section 16 will be described in more detail below.

In the embodiment, the notion of a gate 17 is introduced at the locomotion generation section 14 and the motion reproducing section 15. While the gate 17 is open, the locomotion generation section 14 and the motion reproducing section 15 receive commands from a client. In contrast, when the gate 17 is closed, they reject the commands. The gate 17 is opened and closed by the abnormal state control section 16. When the gate 17 is closed, the gate 17 can handle any command from the abnormal state control section 16, so that an abnormal state can be avoided.

A device manager 18 performs communication with the devices of the robot apparatus, such as the actuators and sensors, in order to transmit command values and receive measurement values.

In the basic operation of the operation control system shown in FIG. 5, the remote operation system 30 monitors an input device signal at the PC application 31 and converts the input device signal into a robot command. The produced command is transmitted to the robot resource control and posture conversion control system module 11 through the gateway 19 in the robot apparatus via the wireless LAN. Then, similarly, a response of the command is transmitted to the PC application 31.

When an abnormal state is detected, any requested command is blocked by an internal operation of the robot apparatus, so that the robot apparatus is not adversely affected by the influence of the input of the operation system. In addition, since the type of abnormal state that has occurred is sent to the operation system, a corresponding feedback operation to the input device 32 can be carried out. When the abnormal state is to be overcome, the operation system is given notification of this, so that the ordinary command input from the remote operation system can be re-started.

Alternatively, when the robot apparatus is to act autonomously, a command can be transmitted from the thinking system module 20 instead of from the remote operation system 30. When an abnormal state is detected, any requested command is blocked by an internal operation of the robot apparatus. When the abnormal state is to be overcome, the operation system is given notification of this, so that the ordinary command input from the remote operation system can be re-started. Even if an abnormal state occurs, the thinking module 20 can be used for, for example, expressing any emotion in accordance with the type of abnormal state.

The operation of the operation control system will hereunder be described in more detail.

When a remote operation is to be performed, the PC application 31 issues a command with respect to the robot apparatus on the basis of an input information obtained through the input device 32, and the command is transmitted to the robot apparatus via the wireless LAN.

When the robot resource control and posture conversion control module 11 receives the command from the remote operation system 30 via the gateway 19, the proper agents 13 plan the operations of the resources and make requests to the locomotion generation unit 14 or the motion reproducing section 15 to realize the operations in accordance with the content of the plan. The locomotion generation section 14 or the motion reproducing section 15 calls the device manager 18 in order to transmit command values to the various devices of the robot apparatus.

From the various devices of the robot apparatus, sensor information detected when they are driven on the basis of the command values is transmitted to the input device in a direction opposite to the direction in which the command values are transmitted.

The device manager 18 also notifies the abnormal state control section 16 about the sensor information that is detected when the various devices are driven on the basis of the command values from the remote operation system 30.

On the basis of the sensor information, the abnormal state control section 16 detects abnormalities, such as those related to torque limiter, overcurrent, "getting caught" prevention, falling, and stability determination. When an abnormality in the apparatus body is detected, the locomotion generation section 14 and the motion reproducing section 15 are instructed to close the gate 17, respond to the gate close command, and rejects any command transmitted from the client (the remote operation system 30 or the thinking module 20) via the gate 17.

Upon the command for closing the gate 17, the abnormal state control section 16 issues a command to the locomotion generation section 14 or the motion reproducing section 15 in order to request an operation of the apparatus body when an abnormality is detected.

When an abnormality is detected, the abnormal state control section 16 notifies the robot resource control and posture conversion control module 11 about the abnormality. The robot resource control and posture conversion control module 11 notifies the remote operation system 30 about the type of abnormality via the gateway 19. The thinking module 20 is also notified about the type of abnormality.

The locomotion generation section 14 or the motion reproducing section 15 performs an abnormality overcoming operation in accordance with the command from the abnormal state control section 16, and returns a status resulting from the execution of the command to the abnormal state control section 16.

The abnormal state control section 16 determines whether or not the abnormality has been overcome on the basis of the sensor information from the various devices of the robot apparatus. When the abnormality is overcome, it instructs the locomotion generation section 14 and the motion reproducing section 15 to open the gate 17. Upon the opening of the gate 17, the locomotion generation section 14 and the motion reproducing section 15 can receive a command from the client through the gate 17.

The abnormal state control section 16 also notifies the robot resource control and posture conversion control module 11 that the abnormality is overcome. The robot resource control and posture conversion control module 11 sends a restoration completion notification to the remote operation system 30 via the gateway 19 and to the thinking module 20.

In the embodiment, the abnormal state control section includes a plurality of abnormal state detectors which are given proper priorities, operate independently and concurrently, and overcome abnormal states with consistency. Here, the abnormal state detectors include those related to, for example, emergency stop, torque limiter detection, overcurrent protection, "getting caught" prevention, fall control, and fall prevention control. Japanese Patent Application No. 2003-403932 already assigned to the applicant discloses an example of a structure of an abnormal state detector which detects an abnormal state, such as overcurrent in a joint driving actuator of the robot apparatus, and which overcomes the abnormal state.

By dynamically manipulating the priorities and effectiveness/ineffectiveness of the abnormal state detectors at the abnormal state control section 16, it is possible to vary the overcoming capability of the robot apparatus in an emergency according to posture, operation mode, or use.

Figure 6:
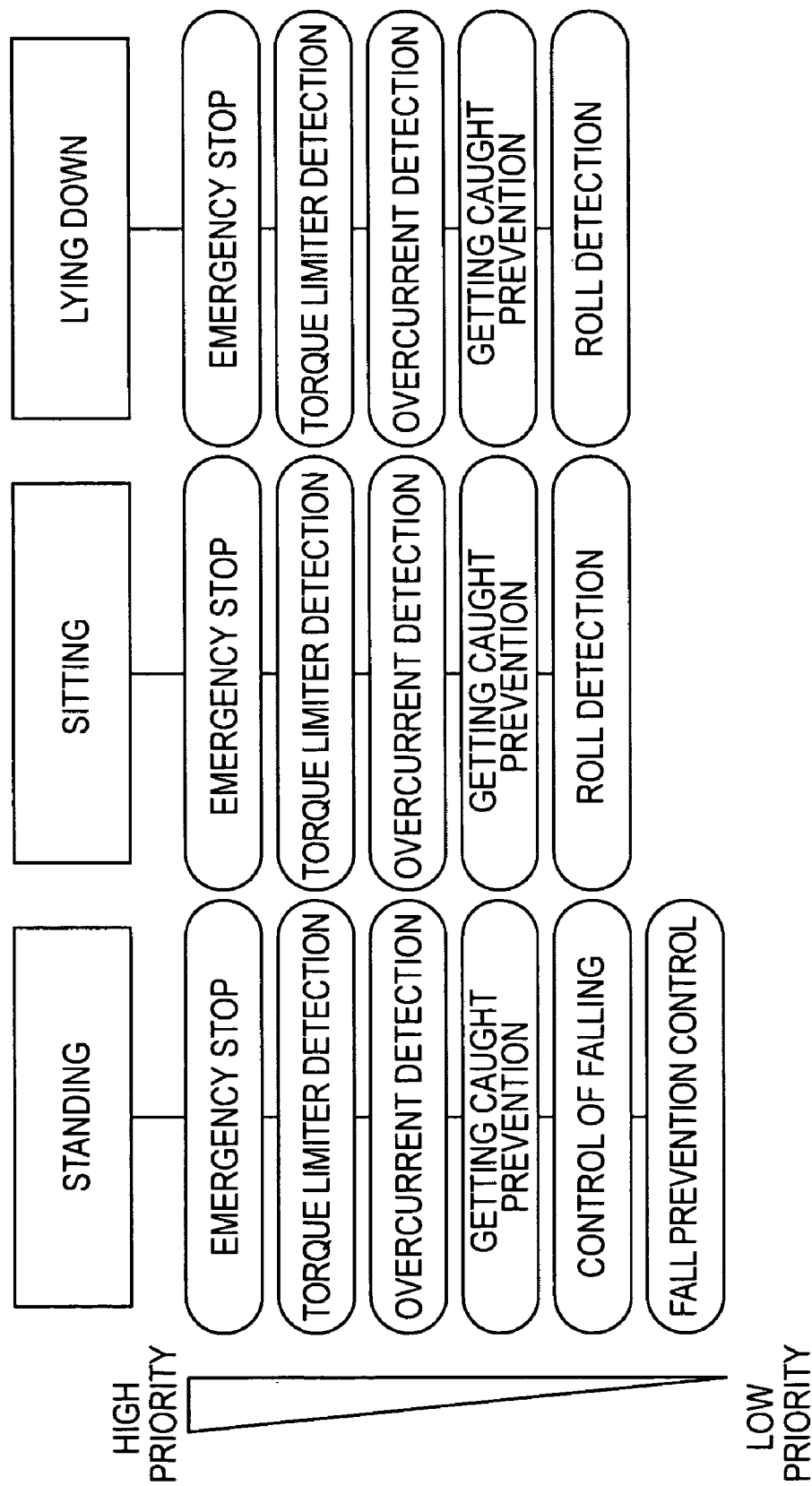
FIG. 6 shows an example in which expected abnormal state detectors are registered according to postures in a bipedal legged mobile robot.

FIG. 6 shows an example in which expected abnormal state detectors are registered according to postures in a bipedal legged mobile robot.

In the illustrated example, three types of postures, standing, sitting, and lying down, are set. In all of the postures, "emergency stop," "torque limiter detection," "overcurrent protection," and "getting caught prevention" are registered in this order of priority. In the standing posture, "fall control" and "fall prevention control" are also registered. In contrast, in the sitting and lying-down postures, the robot does not fall. Therefore, "roll detection" is also registered instead of "fall control" and "fall prevention control."

When the robot is started, the registering of each abnormal state detector is performed with respect to the abnormal state control section 16. The registering parameters are: (1) detection priority, (2) posture of the robot to be achieved, and (3) required detection frequency (frequency with which detection is performed).

Setting the detection frequency makes it possible to reduce calculation load of a processor in terms of overcoming an abnormal state that is not so urgent as to need calling out in each control period.

In each posture, as shown in FIG. 6, the abnormal state detectors are assigned priorities. The abnormal state control section 16 successively starts each of the registered abnormal state detectors in accordance with the order of priority in a predetermined control period in order to cause the abnormal state detectors to operate independently and concurrently in every control period.

Figure 7:
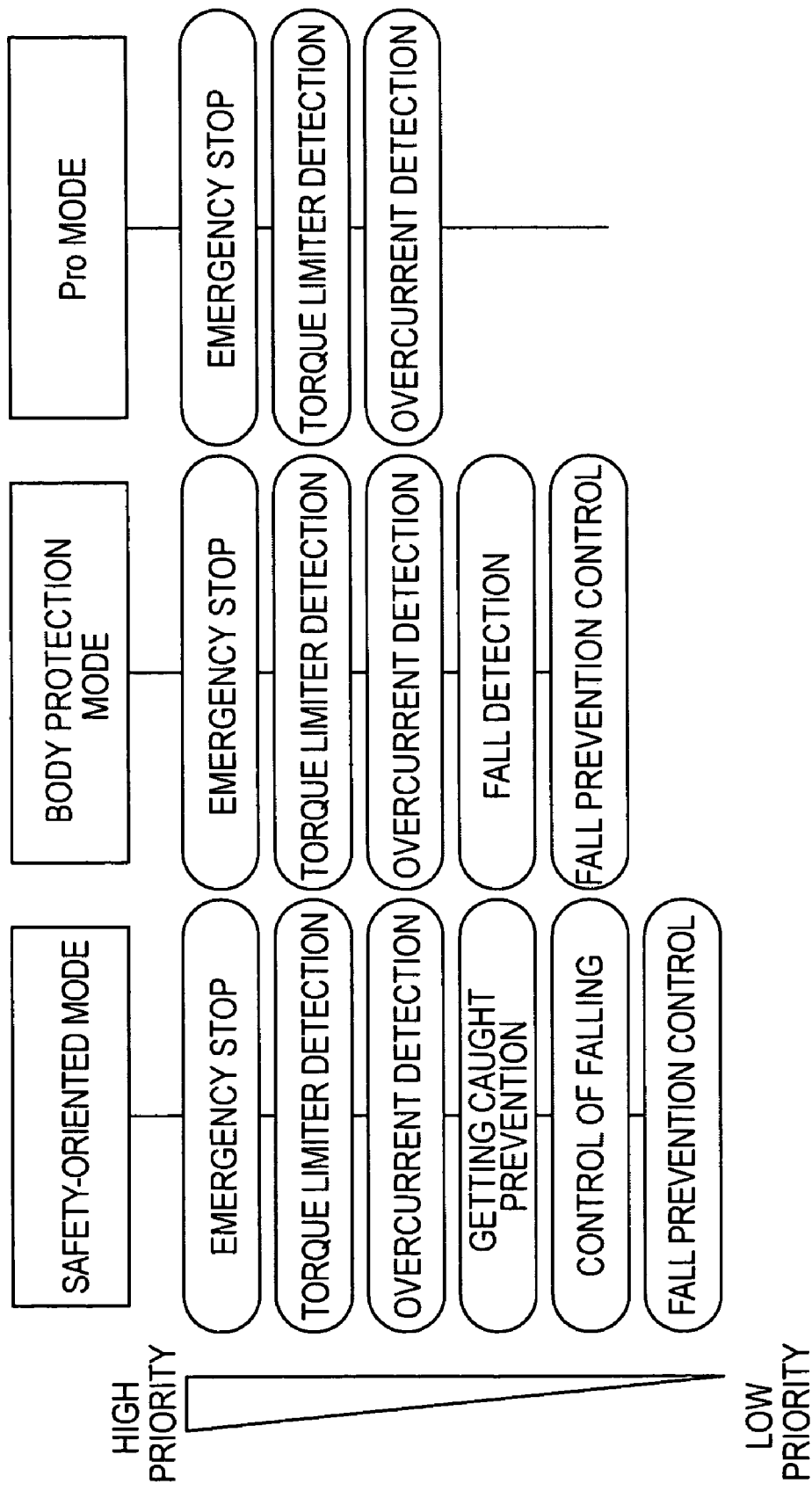
FIG. 7 shows an example in which expected abnormal state detectors are registered according to operation modes of the abnormal state detectors in the bipedal legged mobile robot.

FIG. 7 shows an example in which expected abnormal state detectors are registered according to operation modes of the abnormal state detectors in the bipedal legged mobile robot. In the illustrated example, three types of operation modes are defined, a safety-oriented mode, a body protection mode, and a Pro mode.

The Pro mode is an operation mode for maximally making use of the capabilities of the robot without using various safety devices, and registers or makes effective the minimum number of abnormal state detectors, such as those related to emergency stop, torque limiter detection, and overcurrent, for preventing injury to the robot apparatus. By limiting the number of abnormal state detectors to be operated, it is possible to reduce the calculation load of a processor or to make use of the corresponding calculator resource in posture stability control or operation control of the apparatus body.

The body protection mode is an operation mode for preventing injury to the apparatus body. A bipedal walking erect type robot may receive a fatal injury when it unexpectedly strikes the floor or another object as it falls. To prevent such an injury, the abnormal state detectors related to fall detection and fall prevention also are registered or made effective in addition to the minimum number of abnormal state detectors, such as those related to emergency stop, torque limiter detection, and overcurrent detection, for preventing injury to the robot apparatus as its body operates. However, in this operation mode, the user safety is ignored, so that any abnormal state detector for providing user safety, such as that related to "getting caught" prevention, is made ineffective. In other words, the body protection mode is defined for use in a working environment in which a hand of a person does not touch the robot apparatus, such as when it is demonstrating something.

The safety-oriented mode is an operation mode for maintaining the safety of the apparatus body and the user, and makes effective any abnormal state detector, such as that related to "getting caught" prevention, for providing user safety in addition to the minimum number of abnormal state detectors, such as those related to emergency stop, torque limiter detection, and overcurrent detection, for preventing injury to the robot apparatus as its body operates and the abnormal state detectors, such as those related to fall detection and fall prevention, for protecting the apparatus body.

In these operation modes, as shown in FIG. 7, the abnormal state detectors are assigned priorities. The abnormal state control section 16 successively starts each of the registered abnormal state detectors in accordance with the order of priority in a predetermined control period in order to cause the abnormal state detectors to operate independently and concurrently in every control period.

Figure 8:
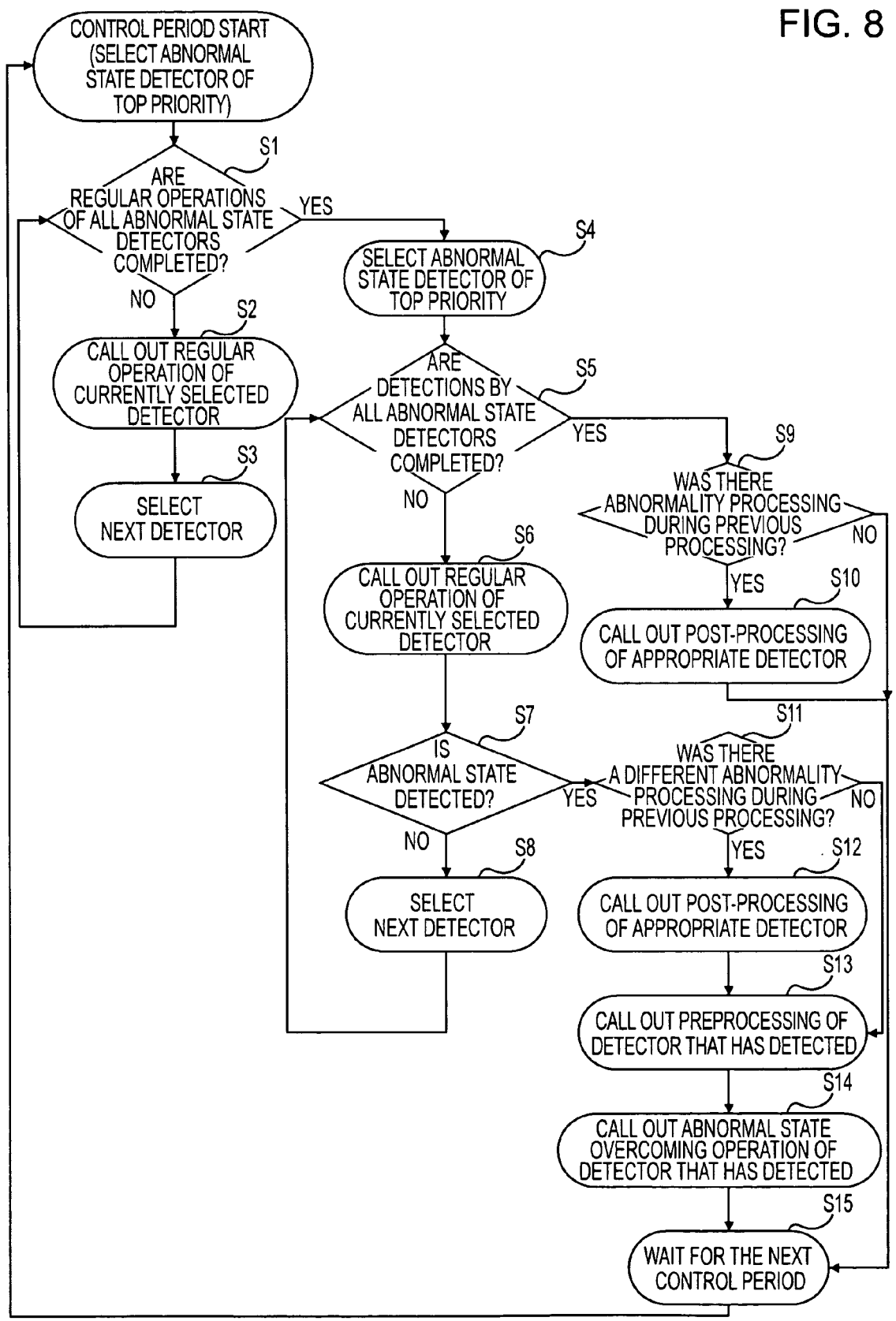
FIG. 8 is a flowchart showing steps of an ordinary procedure in an abnormal state control section 16 that is performed in each predetermined control period.

FIG. 8 is a flowchart showing steps of an ordinary procedure for the abnormal state control section 16 that is performed in each predetermined control period.

In Steps S1 to S3, regular operations related to abnormal state detectors that are made effective in the current posture of the robot are successively called out. Then, the regular operations, such as integration of sensor values, are performed at the abnormal state detectors at this timing.

Next, in Step S4, the abnormal state detectors are called out from those having higher registering priority. Then, in Step S5, the regular operations are called out at the abnormal state detectors. Thereafter, in Step S6, using, for example, deviation between sensor output values and target values, a determination is made as to whether the states of detection objects are in states requiring detection.

Here, if an abnormal state is detected, conditional branching is achieved as follows in accordance with the result of detection of the abnormal state.

If, in Step S11, an abnormality that has not been detected before is detected, and an overcoming operation is carried out during the previous time, post-processing is called out in Step S12. Then, in Step S13, pre-processing that is performed on the abnormality that has occurred is called out. Thereafter, in Step S14, an overcoming operation of the abnormal state that has occurred is subsequently called out. Then, in Step S15, the abnormal state control section 16 waits for the next control period.

When the same abnormal state as the previous one is detected in Step S11, an overcoming operation of the abnormal state is called out with respect to the abnormal state detector in Step S14. When the overcoming operation is completed, post-processing is called out with respect to the abnormal state detector. Then, the abnormal state control section 16 waits for the next control period in Step S15.

If the detection operation ends without any of the abnormal state detectors detecting an abnormality in Step S5, and there was an abnormality processing during the previous overcoming operation in Step S9, that is, an abnormal state that has been detected up to the previous operation is no longer detected, post-processing with respect to the abnormal state detector is called out in Step S10. Then, the abnormal state control section 16 waits for a next control period in Step S15.

If no abnormal state is detected, the abnormal state control section 16 waits for the next control period without doing anything in Step S15.

If, in Step S7, another abnormal state is detected, the abnormal state control section 16 rejects a command from the higher order control system (or the client) at the gate 17 (described above), and notifies the higher order control system about the type of abnormality that has occurred. When the abnormal state that has existed is overcome, the abnormal state control section 16 restarts receiving the command from the higher order control system, and notifies the higher order control system that the abnormal state has been overcome.

Next, the operations of the individual abnormal state detectors will be described. The registered abnormal state detectors are called out from an abnormal state control mechanism in each control period or with a set frequency. Each abnormal state detector performs a regular operation, detects an abnormal state, performs pre-processing of an abnormal state overcoming operation, overcomes the abnormal state, and performs post-processing of the abnormal state overcoming operation. However, the abnormal state detectors need not perform all of the aforementioned operations. The operations that are performed when the abnormal state detectors are called out will hereunder be described with reference to FIG. 9.

Regular Operation

A regular operation, such as integration of a sensor value, which needs to be performed in each control period is carried out at this timing.

Error State Detection Operation

Each abnormal state detector determines whether the current state of the robot has become abnormal, and the result is returned to the control mechanism.

Pre-processing of Abnormal State Overcoming Operation

Pre-processing is required for starting the overcoming of an abnormal state, and is called out prior to the overcoming operation when another abnormal state has been detected.

Abnormal State Overcoming Operation

Abnormal state overcoming operation for one control period is carried out in order to prevent or overcome an abnormal state which its associated abnormal state detector detects. As a result, if the abnormal state overcoming operation is completed, the abnormal state control section 16 is notified about the completion.

Post-processing of Abnormal State Overcoming Operation

Post-processing, such as the releasing of internal resources related to the abnormal state overcoming operation that has been carried out up to this time, is carried out.

When the software is ended due to, for example, the shutting down of the robot body, the ending operation of the abnormal state control section 16 is called out. The abnormal state control section 16 ends its operation after, for example, the internal resources regarding the respective abnormal state detectors that have been used up to this time have been released. The ending operation is called out after the robot apparatus has moved to a safe location or has changed its posture to a safe posture for the safety of the apparatus body.

As described above, according to the embodiment, a plurality of abnormal detectors are registered or made effective at the same time in the robot apparatus. By distributing the priority to each abnormal state detector, the abnormal state control section 16 successively starts each of the registered abnormal state detectors in accordance with the order of priority in a predetermined control period in order to cause the abnormal state detectors to operate independently and concurrently in every control period.

Therefore, the order of priority of the abnormal state detectors is set on the basis of which abnormal state detector is the most important for achieving a safety mechanism of the robot apparatus by the abnormal state control section 16. For example, the order of priority is determined in accordance with the following policy.

(1) Considering the safety of the robot and the user, urgent abnormal state overcoming operations that need to be carried out are assigned higher priority.

(2) If there are abnormal states whose detection conditions are similar, abnormal states having narrower conditions are assigned higher priority.

(3) When an abnormal state A is being overcome, under the condition that an abnormal state B will not occur, the abnormal state A is generally assigned higher priority than the abnormal state B.

In order to make it easier for the abnormal state control section 16 to control the abnormal state detectors, a hierarchy method or a method of grouping the abnormal state detectors may be introduced.

Figure 10:
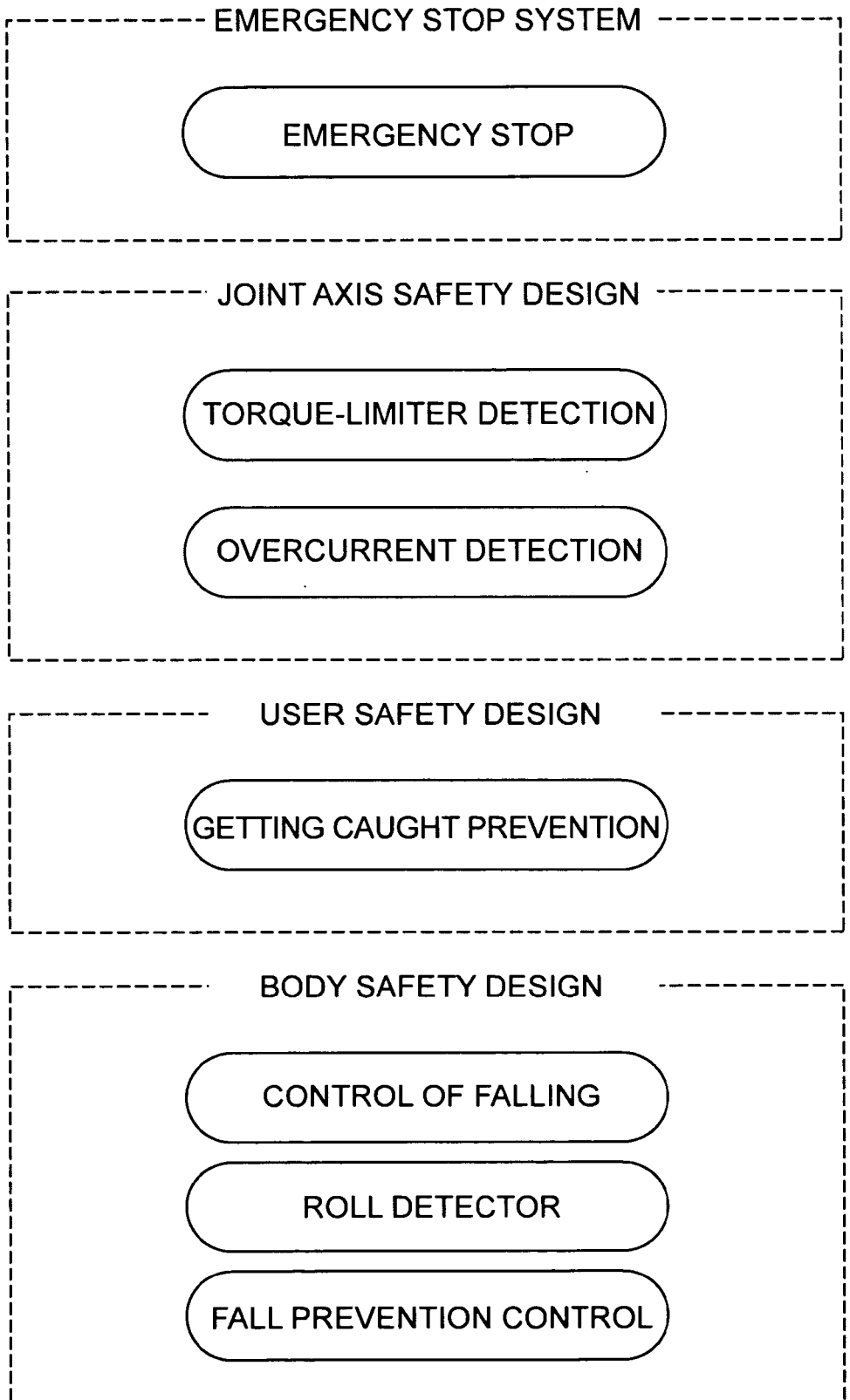
FIG. 10 shows an example in which the abnormal state detectors are grouped.

FIG. 10 shows an example in which the abnormal state detectors are grouped. In the illustrated example, the abnormal state detectors are divided into four groups, an emergency stop system group, a joint axis safety design group, a user safety design group, and a body safety design group.

The emergency stop system group is a group for stopping the operation of the robot in an emergency when an unexpected situation occurs, and performs an emergency stop.

The joint axis safety design group is a group of abnormal state detectors for protecting joint driving actuators disposed at the respective joints, and includes abnormal state detectors such as those related to torque limiter detection and overcurrent detection. The overcoming operations of the abnormal states include, for example, reducing gain of each actuator when an excessive torque or an overcurrent is generated in order to prevent damage to each actuator.

The user safety design group is a group of abnormal state detectors for preventing the user from being injured when, for example, a finger of the user is caught in a link mechanism of the robot, and includes an abnormal state detector related to "getting caught" prevention. This group is indispensable to safety design when commercializing the robot.

The body safety design group is a group required for, for example, a bipedal walking erect type robot whose posture is unstable and which thus requires a posture stability control. The group includes, for example, abnormal state detectors, such as that related to fall prevention for stopping the operation of the robot apparatus when the robot apparatus loses its balance, that related to fall control detection for making the robot apparatus operate passively when an unavoidable point is detected, and that related to roll detection for detecting rolling of the robot apparatus caused by external factors when the robot apparatus is lying down or sitting. For example, this group detects abnormal states and overcomes/prevents them in order to prevent injury or mechanical damage to the robot apparatus by reducing gain of joint driving actuators.

In grouping the abnormal state detectors as shown in FIG. 10, they may be grouped into, for example, abnormal state detectors which detect abnormal states that do not occur at the same time or abnormal state detectors having similar detection conditions. However, it is desirable that an important abnormal state detector such as emergency stop related detector be in one group.

The abnormal state control section 16 successively starts each of the registered abnormal state detectors in accordance with the order of priority in a predetermined control period in order to cause the abnormal state detectors to operate independently and concurrently in every control period. Here, when the abnormal state detectors are grouped as shown in FIG. 10, a method of performing concurrent overcoming operations in group units by assigning priorities to the groups or a method of performing concurrent overcoming operations in accordance with the order of priority of the abnormal state detectors by grouping the abnormal state detectors, mixing the groups of abnormal state detectors, and registering them.

Figure 9:
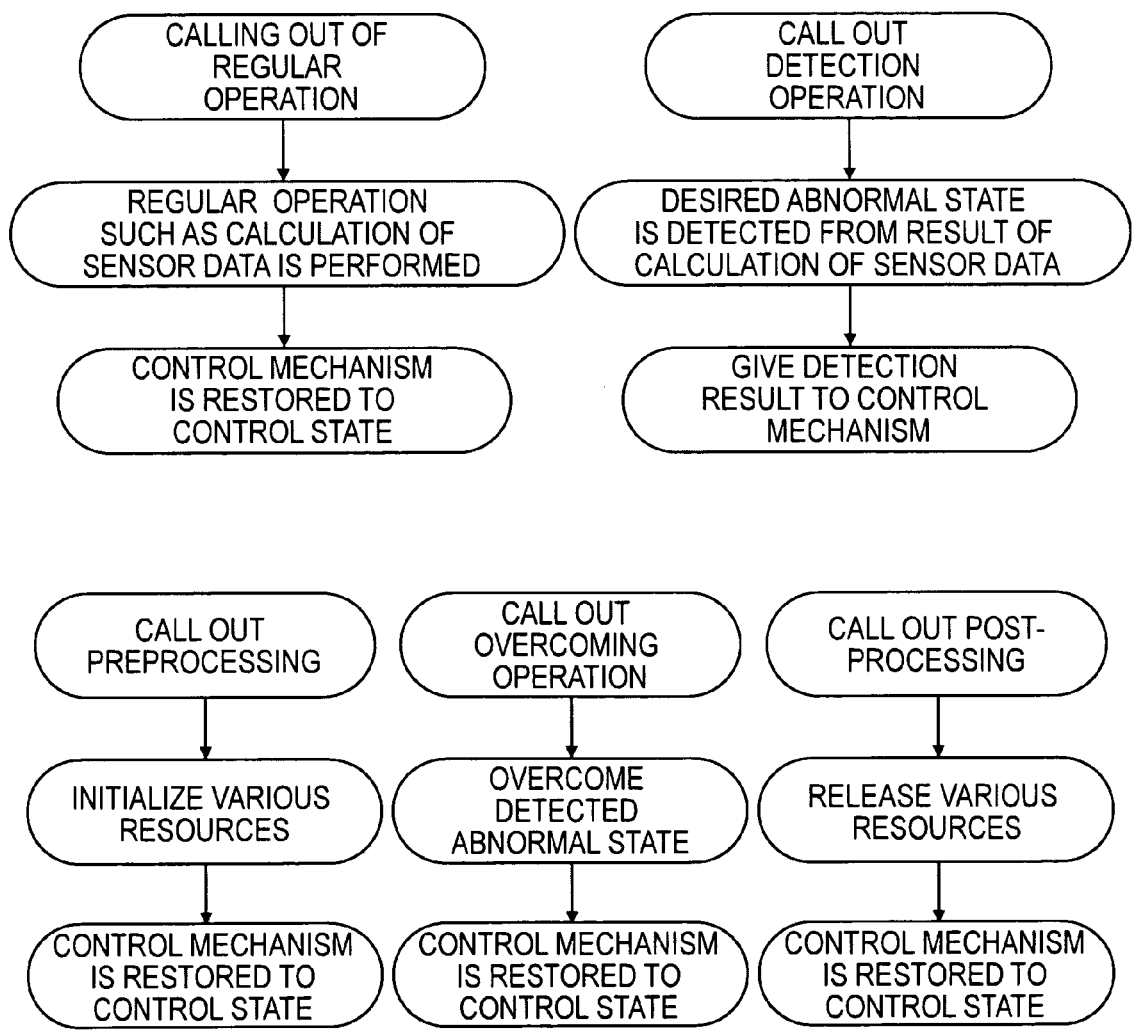
FIG. 9 illustrates operations executed by the abnormal state detectors.
Figure 11:
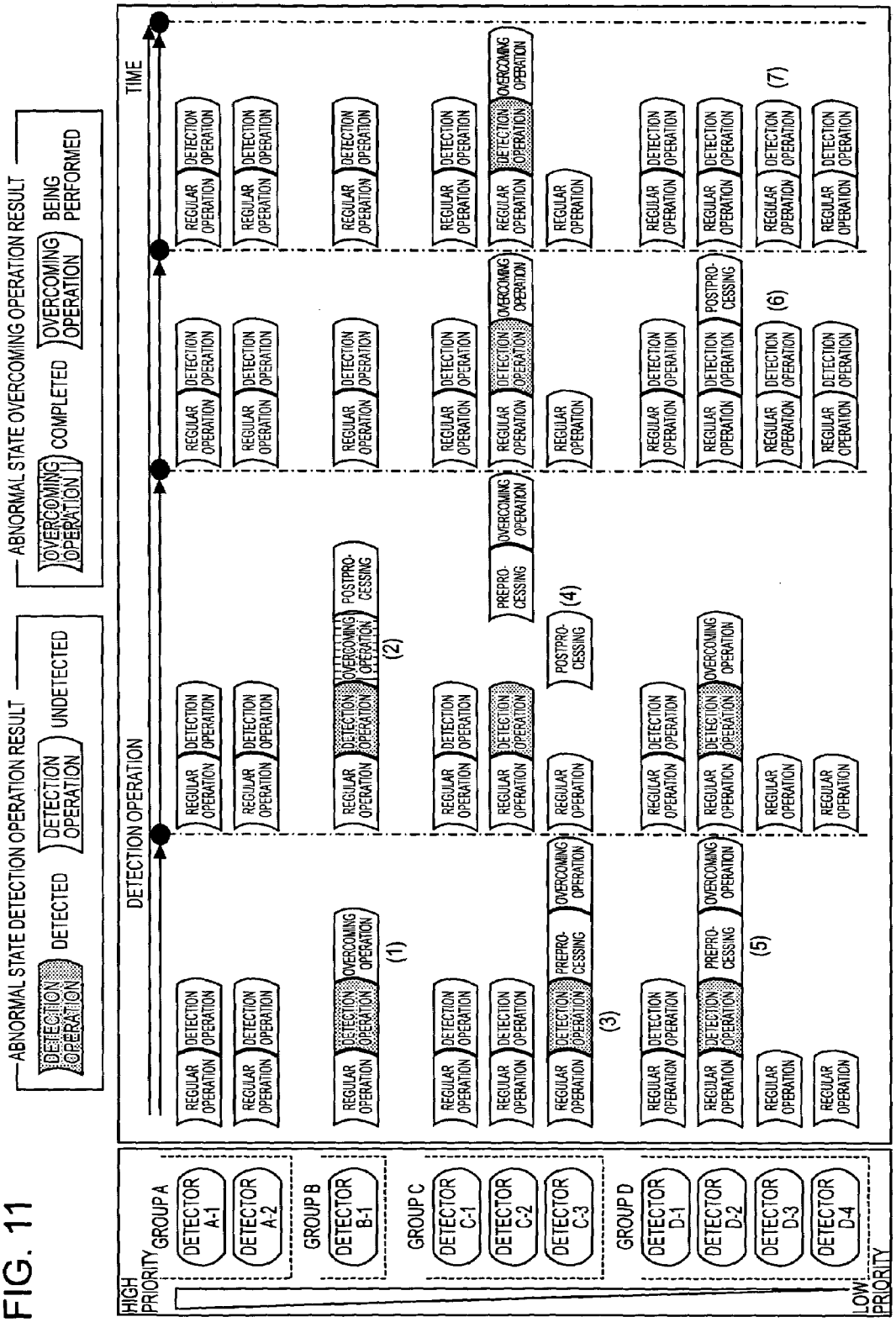
FIG. 11 shows an example of an operation procedure when priorities are assigned according to groups and abnormal state overcoming operations are concurrently performed in each group.

FIG. 11 shows an example of an operation procedure when priorities are assigned according to groups and overcoming operations are performed in group units. Here, as shown in FIG. 9, each abnormal state detector performs a regular operation, detects an abnormal state, performs pre-processing of an abnormal state overcoming operation, overcomes the abnormal state, and performs post-processing of the abnormal state overcoming operation.

As regards the registering of the groups, the abnormal state detectors are initially registered at the abnormal state control section 16, and masking is performed at the abnormal state control section 16, so that the abnormal states are controlled according to the groups.

In the illustrated example, the abnormal state detectors are divided into four groups A to D assigned priorities in this order. The abnormal state detectors in each group are disposed according to the order of priority. The operations of the respective groups and the operations of the respective abnormal state detectors in each group are called out by a round-robin method in accordance with the set order of priority in every control period. When an abnormal state detector in a group detects an abnormality in a certain control period, the detection by another abnormal state detector having lower priority in the same group is stopped, so that, subsequently, only the overcoming operation for the detected abnormal state in the same group is carried out (that is, only one abnormal state detector is operating in the same group).

In group A, abnormal states are not detected in any of the control periods in FIG. 11.

In group B, an overcoming operation is performed at time (1). However, in the illustrated example, the abnormal state does not occur at this timing, but occurs subsequently to a previous control period. Therefore, here, a pre-processing for the abnormal state overcoming operation is not called out. At time (2), the overcoming operation is completed, so that post-processing is performed, as a result of which the robot apparatus is restored to its normal state.

In group C, at time (3), an abnormal state related to an abnormal state detector C-3 occurs. Since, before this abnormal state has been overcome, an abnormal state related to an abnormal state detector C-2 having higher priority is detected at time (4) in the next control period, an overcoming operation is now performed on the abnormal state related to the abnormal state detector C-2.

In group D, at time (5), an abnormal state related to an abnormal state detector D-2 occurs. Since, a similar abnormal state is no longer detected at time (6), post-processing of the abnormal state overcoming operation is executed, so that the robot apparatus is restored to its normal state at time (7).

FIG. 12 shows an example of an operation procedure when the groups are mixed and registered and abnormal states are concurrently overcome according to priorities of the abnormal state detectors. As shown in FIG. 9, each abnormal state detector performs a regular operation, detects an abnormal state, performs pre-processing of an abnormal state overcoming operation, overcomes the abnormal state, and performs post-processing of the abnormal state overcoming operation.

In the illustrated example, the abnormal state detectors are grouped into four groups A to D. The groups are mixed and the abnormal state detectors are disposed according to priorities assigned thereto. The operations of the mixed abnormal state detectors are called out by a round robin method in accordance with the set priorities in each control period.

In this case also, when an abnormal state detector in a group detects an abnormality in a certain control period, the detection of another abnormal state detector having lower priority in the same group is stopped, so that, subsequently, only the overcoming operation of the detected abnormal state in the same group is carried out (that is, only one abnormal state detector is operating in the same group).

The invention has been described in detail while referring to a particular embodiment. However, it is obvious that modifications and substitutions may be made with regard to the embodiment by anyone skilled in the art within a scope not departing from the gist of the present invention.

The gist of the present invention is not necessarily limited to a product called a "robot." In other words, the present invention may similarly be applied to a product of another industrial field, such as a toy, as long as the product is a mechanical device which moves like a human being by making use of electric or magnetic action or any other general movable device.

In the specification, the description has centered on the embodiment in which the present invention is applied to a legged mobile robot apparatus. The gist of the present invention is not limited thereto, so that the invention may be applied to any type of robot mechanism of any form.

In short, the present invention has been described in terms of an embodiment, so that this is not to be construed as limiting the content of the invention. In order to determine the gist of the present invention, the claims should be referred to.

What is claimed is:

1. A device of controlling an operation of a robot apparatus having at least a plurality of movable units, the device comprising:
   driving means for driving the movable units;
   determining means for determining states of the movable units or a state of the robot apparatus;
   a plurality of abnormal state detecting means for detecting abnormal states and performing overcoming operations on the abnormal states on the basis of the determination results determined by the determining means; and
   abnormal state controlling means for causing the abnormal state detections and the overcoming operations to be concurrently performed by the plurality of abnormal state detecting means.

2. The device of controlling an operation of a robot apparatus according to claim 1, wherein the abnormal state controlling means assigns priorities to the plurality of abnormal state detecting means and concurrently operates the abnormal state detecting means on the basis of the priorities.

3. The device of controlling an operation of a robot apparatus according to claim 1, wherein the abnormal state controlling means dynamically performs a setting of an operation of each of the abnormal state detecting means in either an effective or ineffective state, and assigning of priorities.

4. The device of controlling an operation of a robot apparatus according to claim 1, wherein the robot apparatus is capable of taking a plurality of postures, and the abnormal state controlling means registers any abnormal state detecting means to be set in an effective state according to the postures.

5. The device of controlling an operation of a robot apparatus according to claim 4, wherein the robot apparatus is a legged mobile robot having at least a plurality of movable legs and taking at least a standing posture, a sitting posture, and a lying posture, and wherein the abnormal state controlling means registers the abnormal state detecting means related to emergency stop, torque limiter detection, overcurrent protection, getting caught prevention, fall control, and fall prevention control in the standing posture and registers the abnormal state detecting means related to emergency stop, torque limiter detection, overcurrent protection, getting caught prevention, and roll detection in each of the sitting posture and lying posture.

6. The device of controlling an operation of a robot apparatus according to claim 1, wherein the robot apparatus is capable of being in a plurality of operation modes, and the abnormal state controlling means registers any abnormal state detecting means to be set in an effective state according to the operation modes.

7. The device of controlling an operation of a robot apparatus according to claim 6, wherein:
   in a Pro mode for maximally making use of the performance of the robot apparatus, the abnormal state controlling means only registers the minimum number of abnormal state detecting means, including those related to emergency stop, torque limiter detection, and overcurrent detection, for preventing injury to the robot apparatus, in an apparatus body protection mode for preventing injury to the apparatus body, the abnormal state controlling means registers the abnormal state detecting means related to fall detection and fall prevention in addition to the minimum number of abnormal state detecting means, including those related to emergency stop, torque limiter detection, and overcurrent detection, for preventing injury to the robot apparatus resulting from an operation of the apparatus body, and in the operation mode for maintaining the safety of the apparatus body and a user, the abnormal state controlling means registers the abnormal state detecting means, including that related to getting caught prevention, for providing the user safety in addition to the minimum number of abnormal state detecting means, including those related to emergency stop, torque limiter detection, and overcurrent detection, for preventing injury to the robot apparatus resulting from an operation of the apparatus body and the abnormal state detecting means, including those related to fall detection and fall prevention, for protecting the apparatus body.

8. The device of controlling an operation of a robot apparatus according to claim 1, wherein the abnormal state controlling means successively starts the registered abnormal state detecting means according to priority in every predetermined control period or with a set frequency.

9. The device of controlling an operation of a robot apparatus according to claim 1, wherein each abnormal state detecting means performs a regular operation for processing the determination result from the determining means, an abnormality detection operation for determining whether or not the determination result has reached a level at which the abnormality should be detected, preprocessing for starting the overcoming operation of the abnormality, the overcoming operation on the abnormality, and postprocessing of the overcoming operation.

10. The device of controlling an operation of a robot apparatus according to claim 9, wherein the abnormal state controlling means alternately starts the regular operation and the abnormality detection operation in each abnormal state detecting means according to priority.

11. The device of controlling an operation of a robot apparatus according to claim 10, wherein the abnormal state controlling means executes only the overcoming operation on the abnormal state of top priority among the detected abnormal states.

12. The device of controlling an operation of a robot apparatus according to claim 1, wherein the abnormal state controlling means divides the plurality of abnormal state detecting means into two or more groups.

13. The device of controlling an operation of a robot apparatus according to claim 12, wherein the abnormal state controlling means executes only the overcoming operation on the abnormal state of top priority among the detected abnormal states in each group.

14. The device of controlling an operation of a robot apparatus according to claim 12, wherein the abnormal state controlling means assigns priorities to the groups, and successively starts the registered abnormal state detecting means in each group according to the priorities.

15. A method of controlling an operation of a robot apparatus having at least a plurality of movable units, the method comprising the steps of:

determining states of movable units or a state of the robot apparatus in driving the movable units; and controlling abnormal states in which a plurality of abnormal state detection operations are concurrently performed to detect abnormal states and perform abnormal state overcoming operations on the basis of determination results obtained in the determining step.

16. The method of controlling an operation of a robot apparatus according to claim 15, wherein the abnormal state controlling step is performed to assign priorities to the plurality of abnormal state detection operations and to concurrently perform the abnormal state detection operations on the basis of the priorities.

17. The method of controlling an operation of a robot apparatus according to claim 16, wherein the abnormal state controlling step is performed to alternately start the regular operation and the abnormality detection operation in each abnormal state detection operation according to priority.

18. The method of controlling an operation of a robot apparatus according to claim 17, wherein the abnormal state controlling step is performed to execute only the overcoming operation on the abnormal state of top priority among the detected abnormal states.

19. The method of controlling an operation of a robot apparatus according to claim 15, wherein the abnormal state controlling step is performed to dynamically set each of the abnormal state detection operations in either an effective or ineffective state, and to dynamically assign priorities.

20. The method of controlling an operation of a robot apparatus according to claim 15, wherein the robot apparatus is capable of taking a plurality of postures, and the abnormal state controlling step is performed to register any abnormal state detecting means to be set in an effective state according to the postures.

21. The method of controlling an operation of a robot apparatus according to claim 20, wherein the robot apparatus is a legged mobile robot having at least a plurality of movable legs and taking at least a standing posture, a sitting posture, and a lying posture, and wherein the abnormal state controlling step is performed to register the abnormal state detection operations related to emergency stop, torque limiter detection, overcurrent protection, getting caught prevention, fall control, and fall prevention control in the standing posture and to register the abnormal state detection operations related to emergency stop, torque limiter detection, overcurrent protection, getting caught prevention, and roll detection in each of the sitting posture and lying posture.

22. The method of controlling an operation of a robot apparatus according to claim 15, wherein the robot apparatus is capable of being in a plurality of operation modes, and the abnormal state controlling step is performed to register any abnormal state detecting means to be set in an effective state according to the operation modes.

23. The method of controlling an operation of a robot apparatus according to claim 22, wherein:

in a Pro mode for maximally making use of the performance of the robot apparatus, the abnormal state controlling step is performed to only register the minimum number of abnormal state detection operations, including those related to emergency stop, torque limiter detection, and overcurrent detection, for preventing injury to the robot apparatus, in an apparatus body protection mode for preventing injury to the apparatus body, the abnormal state controlling step is performed to register the abnormal state detection operations related to fall detection and fall prevention in addition to the minimum number of abnormal state detection operations, including those related to emergency stop, torque limiter detection, and overcurrent detection, for preventing injury to the robot apparatus resulting from an operation of the apparatus body, and in the operation mode for maintaining the safety of the apparatus body and a user, the abnormal state controlling step is performed to register the abnormal state detection operations, including that related to getting caught prevention, for providing the user safety in addition to the minimum number of abnormal state detection operations, including those related to emergency stop, torque limiter detection, and overcurrent detection, for preventing injury to the robot apparatus resulting from an operation of the apparatus body and the abnormal state detection operations, including those related to fall detection and fall prevention, for protecting the apparatus body.

24. The method of controlling an operation of a robot apparatus according to claim 15, wherein the abnormal state controlling step is performed to successively start the registered abnormal state detection operations according to priority in every predetermined control period or with a set frequency.

25. The method of controlling an operation of a robot apparatus according to claim 15, wherein each abnormal state detection operation includes a regular operation for processing the determination result obtained by the determining step, an abnormality detection operation for determining whether or not the determination result has reached a level at which the abnormality should be detected, preprocessing for starting the overcoming operation of the abnormality, the overcoming operation on the abnormality, and postprocessing of the overcoming operation.

26. The method of controlling an operation of a robot apparatus according to claim 15, wherein the abnormal state controlling step is performed to divide a plurality of abnormal state detecting means into two or more groups.

27. The method of controlling an operation of a robot apparatus according to claim 15, wherein the abnormal state controlling step is performed to execute only the overcoming operation on the abnormal state of top priority among the detected abnormal states in each group.

28. The method of controlling an operation of a robot apparatus according to claim 15, wherein the abnormal state controlling step is performed to assign priorities to the groups, and successively start the registered abnormal state detection operations in each group according to the priorities.

29. A device of controlling an operation of a robot apparatus having at least a plurality of movable units, the device comprising:

a driver driving the movable units;

a determiner determining states of the movable units or a state of the robot apparatus;

a plurality of abnormal state detectors detecting abnormal states and performing overcoming operations on the abnormal states on the basis of the determination results determined by the determiner; and an abnormal state controller causing the abnormal state detections and the overcoming operations to be concurrently performed by the plurality of abnormal state detectors.

* * * * *